(12) United States Patent
Imamichi

(10) Patent No.: US 8,230,200 B2
(45) Date of Patent: Jul. 24, 2012

(54) IMAGE FORMING APPARATUS CAPABLE OF CREATING, MANAGING AND USING JOB HISTORY AND CONTROL METHOD FOR THE SAME

(75) Inventor: Takahiro Imamichi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1114 days.

(21) Appl. No.: 12/149,653

(22) Filed: May 6, 2008

(65) Prior Publication Data

US 2008/0282065 A1  Nov. 13, 2008

(30) Foreign Application Priority Data

May 10, 2007 (JP) ................................. 2007-125856
May 24, 2007 (JP) ................................. 2007-138097

(51) Int. Cl.
*G06F 9/30* (2006.01)
(52) U.S. Cl. ........................ 712/208; 718/102
(58) Field of Classification Search .................. None
See application file for complete search history.

(56) References Cited

U.S. PATENT DOCUMENTS

| 5,153,744 A * | 10/1992 | Nobuta ........................ 358/400 |
| 5,377,016 A * | 12/1994 | Kashiwagi et al. ........... 358/403 |
| 5,392,131 A * | 2/1995 | Umeno ........................ 358/403 |
| 7,746,490 B2 * | 6/2010 | Sawada ........................ 358/1.14 |
| 2002/0065871 A1 * | 5/2002 | Wakai et al. ................. 709/202 |
| 2005/0105923 A1 * | 5/2005 | Utsunomiya ................... 399/21 |
| 2005/0111045 A1 * | 5/2005 | Imai ............................. 358/1.18 |
| 2005/0257275 A1 * | 11/2005 | Ooba ............................. 726/28 |
| 2006/0061820 A1 * | 3/2006 | Okamoto et al. ............. 358/1.15 |
| 2006/0123471 A1 * | 6/2006 | Fontanella et al. ............ 726/5 |
| 2007/0139743 A1 * | 6/2007 | Namizuka ..................... 358/537 |
| 2007/0176946 A1 * | 8/2007 | Matoba ........................ 345/619 |
| 2007/0188824 A1 | 8/2007 | Imamichi |
| 2008/0040311 A1 | 2/2008 | Imamichi |
| 2008/0055633 A1 * | 3/2008 | Kajiyama et al. ............ 358/1.15 |

FOREIGN PATENT DOCUMENTS

| JP | 2001-265761 | 9/2001 |
| JP | 2003-280946 | 10/2003 |

* cited by examiner

*Primary Examiner* — Idriss N Alrobaye
(74) *Attorney, Agent, or Firm* — Harness, Dickey & Pierce

(57) ABSTRACT

An image forming apparatus includes a job-history managing unit that creates and manages a job history, registers a job history, as a job history instance, containing an operation code that instructs a series of job operations to be executed and also containing an operating condition of the job operation, and that registers a macro instance which can be interpreted by other image forming apparatuses and is encoded to an executable shared code. The image forming apparatus also includes an interpreter unit that reads the job history instance, encodes the operation code to the shared code, and registers the shared code as the macro instance.

9 Claims, 21 Drawing Sheets

FIG. 3

| NO. | DATE | JOB (FUNCTION) | PROGRAM NAME | VERSION | OPERATING CONDITION | HW-IN-USE | MODEL NUMBER | USER ID VALUE |
|---|---|---|---|---|---|---|---|---|
| 1 | 2007/3/5 | COPY | Copy_Program | 0.0.1 | A4, COLOR 2 IN 1 4 | SCANNER PRINTER | Sc511 P2a-D | A |
| 2 | 2007/2/28 | FAX | Fax_Program | 0.0.2 | 0X-5XX1 -ABCD | SCANNER FAX-MODEM | Sc511 Fax2581 | B |
| ... | ... | ... | ... | ... | ... | ... | ... | ... |

FIG. 10

| NO. | DATE | JOB-HISTORY CONTENTS LIST |
|---|---|---|
| 1 | 2007/3/15 | COPY, A4, 4 COPIES, 2 IN 1··· |
| 2 | | |
| 3 | 2007/2/24 | STORAGE OF DOCUMENTS, FILE NAME··· |
| 4 | 2006/12/28 | MAIL, SENDING OF TRANSACTIONS (MACRO)··· |

JOB HISTORY LIST  ! UNAVAILABLE WITH THIS DEVICE. TOUCH BUTTON FOR DETAILS···

JOB HISTORY NO.2 CANNOT BE REPRODUCED
REASON: NO FAX UNIT
FAX UNIT REQUIRED FOR JOB IS

MODEL NUMBER FX2581

HERE FOR SOLUTION

CANCEL

FIG. 12
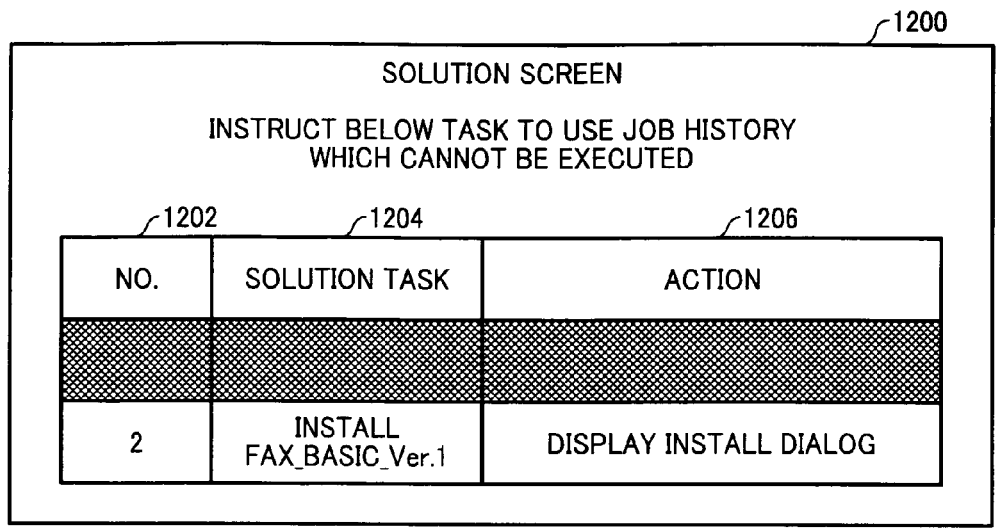
FIG. 13
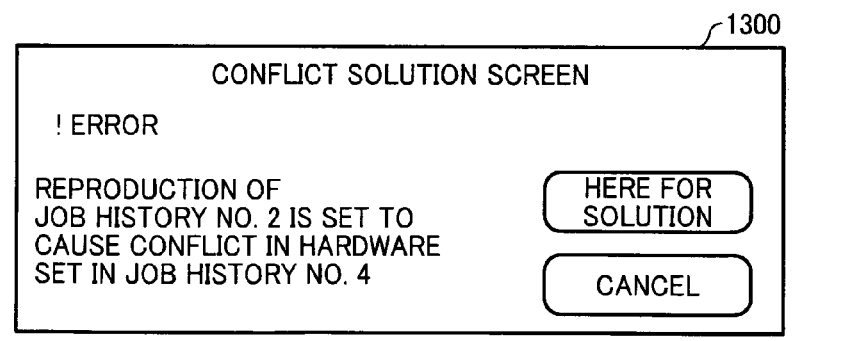
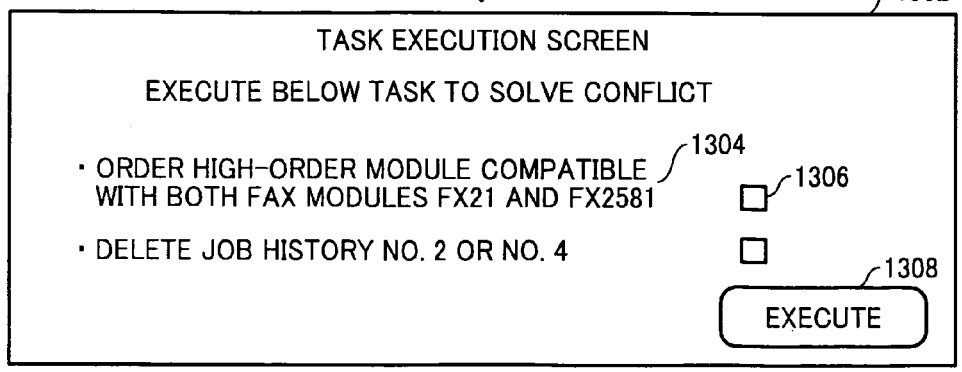

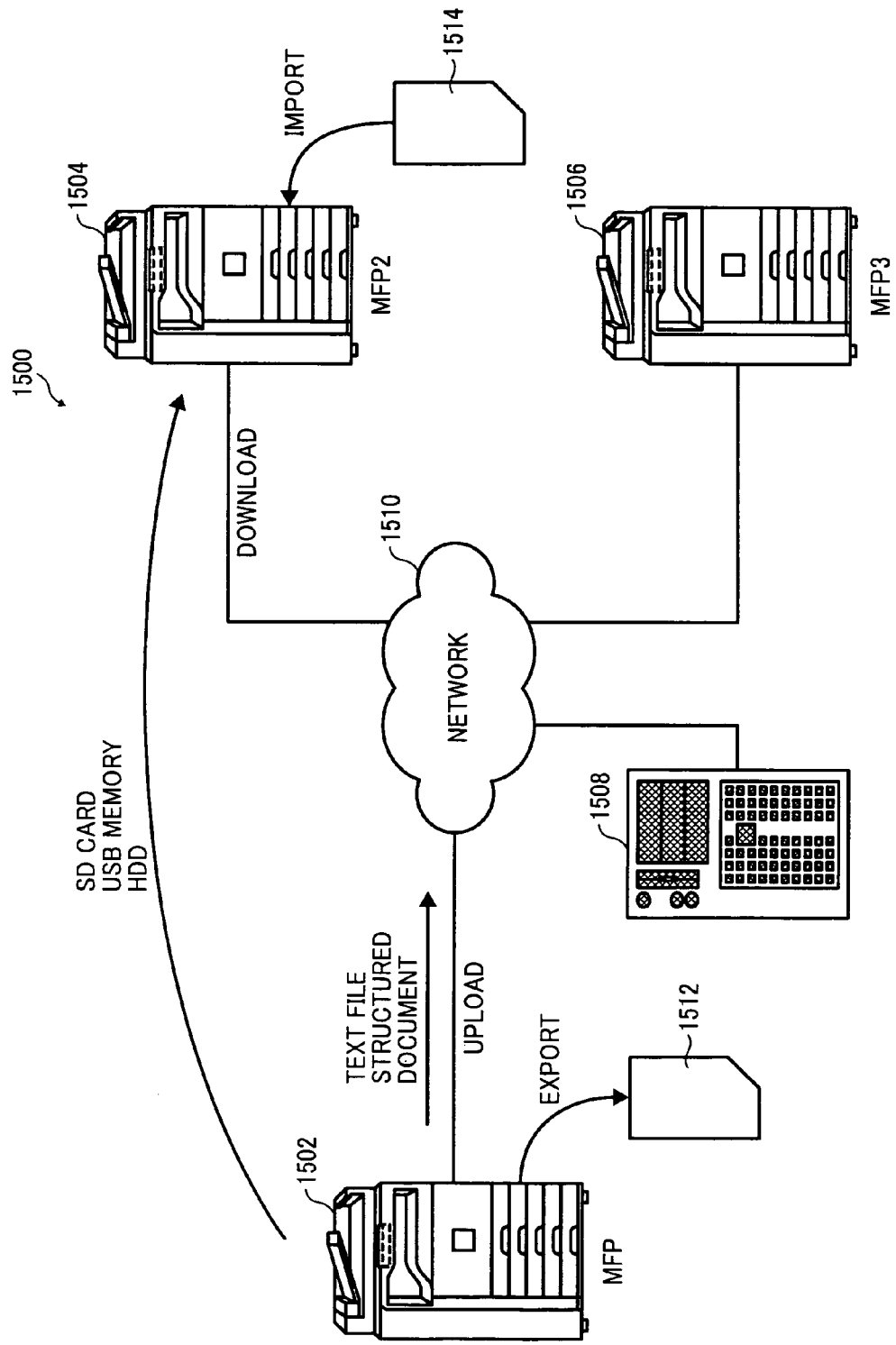

| ID VALUE | NAME | JOB (FUNCTION) | OPERATION ID VALUE | VERSION | OPERATING CONDITION | CREATOR NAME | CREATED DATE | COMMENT | DATA ATTRIBUTE |
|---|---|---|---|---|---|---|---|---|---|
| 1 | EXECUTE COPYING | COPY | 015384 | 0.0.1 | A4, COLOR 2 IN 1 4 | A | 2007/02/05 | COPY TO APPROPRIATE SIZE | MACRO |
| 2 | NULL | FAX | 248113 | 0.0.2 | 0X-5XX1-ABCD | B | 2007/01/05 | NULL | JOB HISTORY |

| DEVICE-SPECIFIC CODE | TEXT CODE |
|---|---|
| 001 | COPY |
| 002 | AUTO DOCUMENT FEEDER |
| 003 | FACSIMILE |
| 004 | MAIL |
| 005 | PDF CONVERSION |
| 006 | START |
| ⋮ | ⋮ |

FIG. 23

JOB HISTORY LIST

| NO. | DATE | JOB-HISTORY CONTENTS LIST |
|---|---|---|
| 1 | 2007/3/15 | COPY, A4, 4 COPIES, 2 IN 1... |
| | | |
| 3 | 2007/2/24 | STORAGE OF DOCUMENTS, FILE NAME... |
| 4 | 2006/12/28 | MAIL, SENDING OF TRANSACTIONS... |
| . | . | . |
| . | . | . |

SAVE

FIG. 24

MACRO EDITING SCREEN

REGISTER

CANCEL

NAME [         ]

OPERATION: COPY VER. 2
OPERATING CONDITION [CHANGE]
SIZE: A4  PROCESS: 2 IN 1
NUMBER OF COPIES: 4 COPIES   COLOR: FULL COLOR
OPTION: ADDITION OF ICON

COMMENT: [         ]

FIG. 25

| ID VALUE | NAME | JOB (FUNCTION) | OPERATION ID VALUE | VERSION | OPERATING CONDITION | CREATOR NAME | CREATED DATE | COMMENT | ICON | DATA ATTRIBUTE |
|---|---|---|---|---|---|---|---|---|---|---|
| 1 | EXECUTE COPYING | COPY | 015384 | 0.0.1 | A4 COLOR 2 IN 1 4 | A | 2007/02/05 | COPY TO APPROPRIATE SIZE | | MACRO |
| 2 | | FAX | 248113 | 0.0.2 | 0X-5XX1-ABCD | B | 2007/01/05 | | Facsimile.jpg | JOB HISTORY |
| 3 | FACSIMILE TRANS-MISSION | FAX | 248113 | 0.0.2 | 0X-5XX1-ABCD | B | 2007/01/05 | FACSIMILE TRANS-MISSION: xxx DIVISION | Facsimile.jpg | MACRO |

IMAGE FORMING APPARATUS CAPABLE OF CREATING, MANAGING AND USING JOB HISTORY AND CONTROL METHOD FOR THE SAME

CROSS-REFERENCE TO RELATED APPLICATIONS

The present application claims priority to and incorporates by reference the entire contents of Japanese priority document 2007-125856 filed in Japan on May 10, 2007, and Japanese priority document 2007-138097 filed in Japan on May 24, 2007.

BACKGROUND OF THE INVENTION

1. Field of the Invention

The present invention relates to an image forming apparatus and a method of controlling an image forming apparatus.

2. Description of the Related Art

Processing capability and network connection capability of image forming apparatuses have drastically improved with recent development of information processing technology and network technology. An image forming apparatus called a multifunction product (MFP) includes functions such as a copier function, a printer function, a facsimile (FAX) function, and a network connecting function, to therefore provide functions required by a user.

There has been a desire from users that an image forming apparatus be able to repeatedly execute a certain process that the user has performed once. Therefore, in some image forming apparatuses, a job history indicative of the operations performed by a user is recorded, and a part of the job history, or the entire job history, is selected to cause the image forming apparatus to execute processes in the sequence recorded in the selected job history.

For example, Japanese Patent Application Laid-Open No. 2001-265761 discloses a data editing device that includes a memory unit for storing therein a log of a process of editing operation. The user causes the data editing device to read and display the log stored in the memory unit, and selects an arbitrary range from the displayed log. As a result, the data editing device executes again the process indicated by the selected range at an arbitrarily specified position.

Japanese Patent Application Laid-Open No. 2003-280946 discloses an information processing device that records therein an output screen as job history. The information processing device includes an output monitoring unit that monitors contents of the output screen and detects any change therein, also includes a screen reproducing unit that reproduces contents of the output screen recorded after a specified time, and displays some part after the specified time of log of previous input on the display screen so that the user can view it.

It is usual that image forming apparatuses have different hardware and software configurations depending on where and how they are used. Furthermore, some of the apparatuses have user-customized optional functions. Because of these reasons, a job history created on one apparatus cannot be so easily reproduced as it is on other apparatus even if both the apparatuses are of the same model. Ability to perform punching and stapling, and ability to support a function such as plug-in software to execute any other processes are the example of user-customized optional functions.

Therefore, conventionally, a job history created on one image forming apparatus can only be used in other image forming apparatuses that have the same model as the image forming apparatus on which the job history was created, or to devices that are compatible to the image forming apparatus on which the job history was created. In other words, the conventional job history is device-dependent rather than user-dependent. Therefore, it is often difficult to execute a job history created on one image forming apparatus on other image forming apparatus. Therefore, there was no point in storing a job history created on one image forming apparatus in detachable storage devices, such as a secured digital (SD) card and a universal serial bus (USB) memory, in order to use that job history on other image forming apparatuses.

One approach could be to create a macro of a job history. A macro can be executed on image forming apparatuses of various hardware or software configurations allowing easy sharing of a job history among the image forming apparatuses. However, conditions such as operating conditions need to be additionally registered in a job history to function as the macro. In addition, because both the job history and the macro need to be stored in the image forming apparatus, extra memory resources are required.

Generally, a relatively small storage area is allocated to store job histories in image forming apparatuses. Therefore, job histories and corresponding macros must be stored in the relatively small storage area in the most efficient manner. Moreover, in terms of consumption of memory resources, it is not a wise idea to record in an image forming apparatus a job history of operations performed related to optional functions that are not available in the image forming apparatus but that were available in the image forming apparatuses that created the job history.

The number of job histories that can be stored at any given time is generally limited. Therefore, if the number of job histories exceeds the capacity, an oldest job history is deleted when storing a new job history. If both of job histories and corresponding macros are to be stored, the data amount to be stored becomes about twice. This causes a problem that if the amount of stored data exceeds the capacity, then even those job histories and macros that are frequently used are deleted. In other words, the original object of improving operation efficiency of an image forming apparatus by storing therein frequently used job histories and macros is not achieved.

The problem related to the saving of the memory resources can be dealt with to some extent by storing job histories and macros in detachable storage devices such as SD cards and memory sticks. However, it is desirable to exclude redundancy as data structures of job histories and macros as much as possible from the view point of saving of hardware resources of image forming apparatuses.

Sometimes, job histories and macros created from those job histories are managed separately. In this case, if new information or schema is added to a job history, the same information or the schema needs to be separately added to the corresponding macro. This causes a problem that the correction of one data structure or the addition of the schema thereto has to be independently performed on the other data structure. The problem causes the user to perform redundant registration operations, which causes a new problem to occur. The new problem is that the similarity (or correspondence) between the job history and the macro cannot be ensured caused by correction error or the like.

SUMMARY OF THE INVENTION

It is an object of the present invention to at least partially solve the problems in the conventional technology.

According to an aspect of the present invention, there is provided an image forming apparatus that executes a job by using a job history. The image forming apparatus includes a buffering unit that buffers an operation code specific to the image forming apparatus and an operating condition corresponding to the operation code; an interpreter unit that encodes an operation code, which has been buffered in the buffering unit, to a text code and decodes original operation code from the text code; and a shared-history creating unit that creates a shared job history that describes encoded text code and an operating condition corresponding to the encoded text code in association with a sequence of operation codes; and a re-executing unit that reads a shared job history created by other image forming apparatus and re-executes operation codes in read shared job history in order of being decoded.

According to another aspect of the present invention, there is provided a method of controlling an image forming apparatus that executes a job by using a job history. The method includes buffering an operation code specific to the image forming apparatus and an operating condition corresponding to the operation code; encoding an operation code, which has been buffered in the buffering, to a text code and decoding original operation code from the text code; creating a shared job history that describes encoded text code and an operating condition corresponding to the encoded text code in association with a sequence of operation codes; and reading a shared job history created by other image forming apparatus and re-executing operation codes in read shared job history in order of being decoded.

According to still another aspect of the present invention, there is provided an image forming apparatus that creates and manages a job history. The image forming apparatus includes a job-history managing unit that stores therein a job history as a job history instance, and a macro instance, the job history containing an operation code that instructs a job operation to be executed and also containing an operating condition of the job operation, and the macro instance can be interpreted by other image forming apparatus, contains an attribute to reproduce the job history, and is encoded to an executable shared code; and an interpreter unit that reads the job history instance to encode the operation code to the shared code, and creates an attribute value of the macro instance. When a changeable attribute is changed, the job-history managing unit changes a corresponding attribute of other instance to be created.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic of an example of a job history table;

FIG. 8 is a flowchart of a process for downloading a shared job history through a network from a shared storage formed of a storage server or the like;

FIG. 10 is a schematic of an example of a user interface displayed in the handling process;

FIG. 12 is a schematic of an example of a task screen;

FIG. 13 is a schematic of an example of a conflict solution screen;

FIG. 15 is a schematic for explaining a method of sharing a job history implemented by using the image forming apparatus;

FIG. 23 is a schematic of a screen of a job-history contents list displayed when a job history is read;

FIG. 24 is a schematic of an example of a macro editing screen;

FIG. 25 is a schematic of an example of a data structure when the image forming apparatus creates a job history and a corresponding macro.

DETAILED DESCRIPTION OF THE PREFERRED EMBODIMENTS

Figure 1:
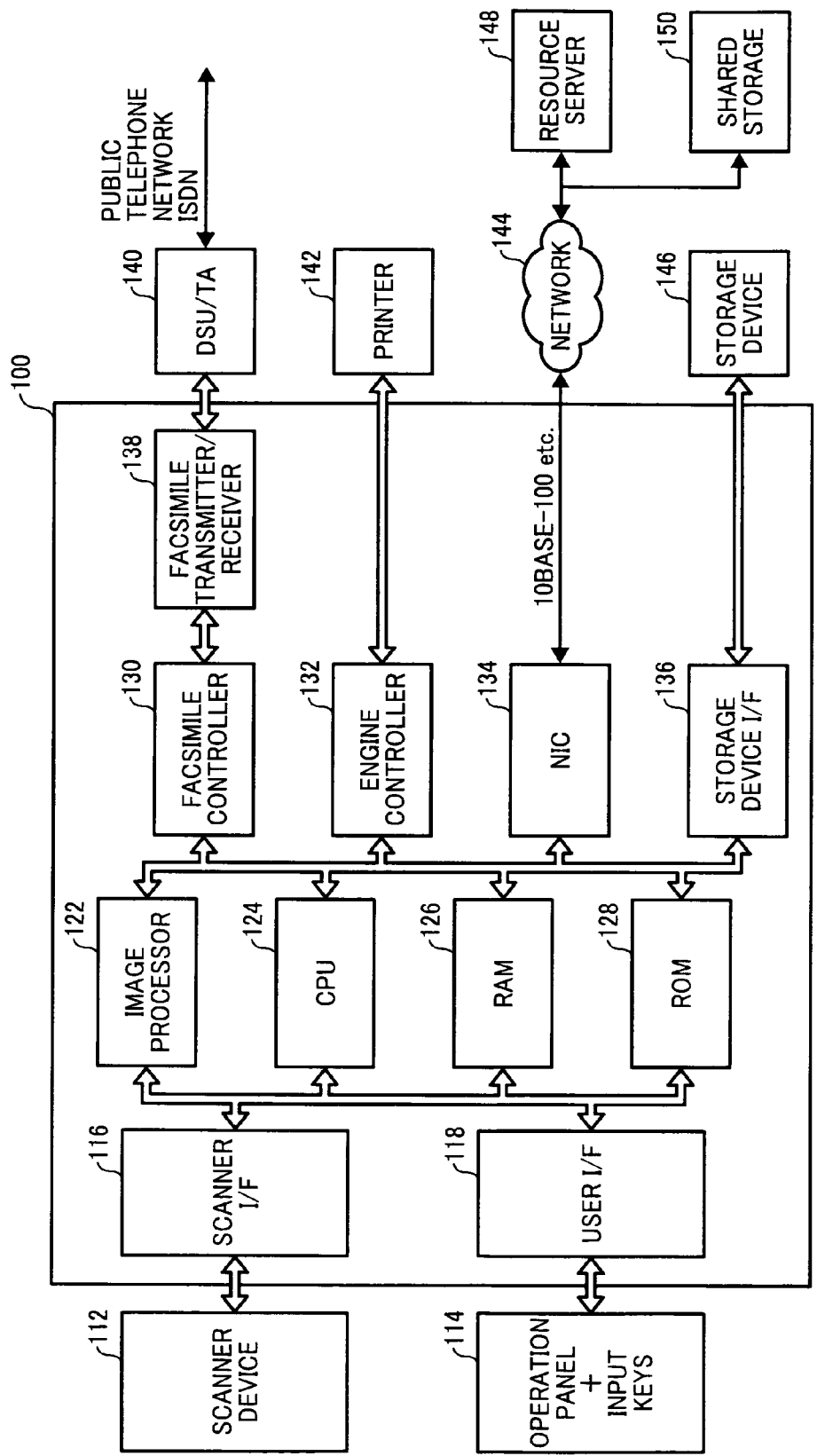
FIG. 1 is a functional block diagram of an image forming apparatus according to a first embodiment of the present invention.

Exemplary embodiments of the present invention are explained in detail below with reference to the accompanying drawings. However, the present invention is not limited by the embodiments.

An outline and operating conditions of a first embodiment are explained first. In the first embodiment, an input operation performed by a user of an image forming apparatus is stored as a job history. The image forming apparatus buffers entries received through the operation of an input device. The input device can be input keys that are generally provided on an operation panel of the image forming apparatus, or can be a touch panel that is sometimes provided on the operation panel. Upon receiving a job execution code through depression of a job start button provided on the operation panel, the image forming apparatus executes a set job such as copying, facsimile transmission, email transmission/reception, and network search. The image forming apparatus includes an interpreter unit which is described in C language, a script language, Java™, or the like. The interpreter unit converts input data input through the input device, from a device-specific code to a text code. More specifically, the input data are recorded at an interval between start of operation and depression of the job start button or between depressions of the job start button which are adjacent to each other in an operation sequence.

The image forming apparatus then activates a shared-job-history creating unit described in the C language, the script language, Java™, or the like, creates a header specifying a job history, and describes the text code created by the interpreter unit in the order of job histories. A shared job history created by the shared-job-history creating unit can be in a plain text format. The shared job history can also be created as a structured document such as HyperText Markup Language (HTML) or Extensible Markup Language (XML). If the job specified by the user is, for example, a copying job, the job is converted to "copy" as a text code. If XML, the job can be identified by a optionally set tag such as <copy>.

On the other hand, the job start button is identified by a text code such as "start" or <start>, </start>, or by a job end code specified by an optionally set tag. The shared job history is created job by job as a set of "job type/operating conditions/device environment/job end code", corresponding to each job history entered by the user. A shared-job-history storage unit can store the shared job history in a detachable memory unit such as an SD card, an USB memory, and a hard disk drive (HDD). Alternatively, the shared job history can be stored together with user identifying information such as a user ID and password, in a shared storage connected thereto through a network.

The operating conditions can include paper size, number of copies, setting of stapling, setting of punching, facsimile number, facsimile specifications such as Group 3 (G3) and Group 4 (G4), email address, destinations for multi-address transmission, a compression method for a portable document format (PDF), and a file conversion condition such as resolution.

The shared-job-history creating unit includes one or more of a text editor, an HTML editor, and an XML editor. The interpreter unit and the shared-job-history creating unit are activated in response to reception of a shared-job-history creation instruction. A shared-job-history creation instruction is an instruction given by the user explicitly upon starting a job to create a shared job history and it contains an operating condition. A job history is created at a processing interval as a unit from start of a job to depression of the job start button until a job-history registration instruction is received from the user, and the created job history is registered. This job history is a shared job history, in that it is created and registered in such a manner it can be shared by other image forming apparatuses. In other examples, the image forming apparatus receives the job-history registration instruction from the user in a stage in which a series of operations is completed and can also convert a device-specific code to a text code even if the explicit shared-job-history creation instruction is not received from the user.

Various methods can be employed for converting device-specific codes to text codes. For example, conversion of a device-specific code to a text code can be performed one by one for the entries received through the input device. Alternatively, all the entries received through the input device from the start of the operation by the user can be buffered, and conversion of a device-specific code to a text code can be collectively performed for all the buffered entries.

The device environment indicates data indicative of device-specific hardware environment or software environment of a device. As the device environment, a software type, a software version, and a hardware type can also be employed.

The image forming apparatus always performs the converting process of the job history and can store the converted job history in the memory unit and the shared storage in response to a job-history registration instruction received from the user. The job history can be stored in a nonvolatile memory unit such as a nonvolatile random access memory (NVRAM) in the image forming apparatus when the job-history registration instruction is received from the user. In this case, only a job pattern specified by the user can be registered, and this enables to extend a period during which the job history has to be deleted from the NVRAM due to limitation of the number of items.

The user causes the memory unit to store therein the job history or causes other image forming apparatus to read the shared job history registered in the shared storage. The other image forming apparatus having read the shared job history activates the interpreter unit to analyze a structured document, convert the job history described in the structured document into a device-specific code, describe the device-specific code according to a process sequence of the device, and create the device-specific job history. When the job history is to be converted into the device-specific code, the image forming apparatus executes the conversion by skipping conversion thereof into the text code such as "start" or <start>.

Moreover, the interpreter unit can insert a wait code indicating waiting at a position where a job execution code such as "start" is described until the job start button is input. Even if the other image forming apparatus reads the shared job history, these processes allow the user to customize operating conditions for a job that the user wants to execute at that point while using the shared job history. Therefore, even if the user customizes the operating conditions, the shared job history can be effectively used without interrupting the process of the shared job history.

The user executes the processes job by job until the job start button is input from the image forming apparatus used by the user, and thus the user can add an entry such as the number of copies, the number of sheets to be transmitted, a facsimile number used to perform broadcasting, or a mail address during the time. Therefore, a routine operation can be repeated while the user enters input data corresponding to a request at that point with a minimum amount of entries.

The image forming apparatus determines, by referring to a converter used by the interpreter unit, whether the process for a device-specific code can be executed during the process of converting the job into the device-specific code. As a result of determination, if it is required to convert the job to a device-specific code which is not registered in the converter implemented as the conversion table, the image forming apparatus displays a display screen for informing the user of a message that a function specified by the text code cannot be used, and prompts the user to perform the process such as acquiring or downloading of a necessary optional function or plug-in program. During that time, the user selects a unit of job which can be provided at that time, of the processes that the user will execute, and the image forming apparatus executes the job.

The details of the first embodiment are explained below. FIG. 1 is a functional block diagram of an image forming apparatus 100 according to the first embodiment. The image forming apparatus 100 acquires image data from a scanner device 112 that includes an automatic document feeder (ADF), and acquires data for an operation through an input device such as an operation panel and input keys 114 via a user interface (I/F) 118. The image data acquired by the scanner device 112 is sent to an image processor 122 through a scanner I/F 116. The image forming apparatus 100 includes a central processing unit (CPU) 124 that functions as a system controller. The CPU 124 controls each execution of application processing units by using an object call, a method call, or the like.

The image forming apparatus 100 includes a random access memory (RAM) 126 that performs processes on an image acquired by the ADF or provides an execution space for application software, and a read only memory (ROM) 128 that stores therein data used for processes, a program, or initial setting conditions. The RAM 126 and the ROM 128 enable the CPU 124 to perform initial setting of the image processing unit, and enable functions corresponding to the processes in the CPU 124 to be provided.

More specific examples of the CPU used by the image forming apparatus 100 of the present invention include PENTIUM™ TO PENTIUM™ IV, PENTIUM™-compatible CPUs, POWER PC™, and Microprocessor without Interlocked Pipeline Stages (MIPS).

The image forming apparatus 100 includes an object-oriented database (hereinafter, "OODB"), and loads OODB software from a storage device 146 such as a hard disk drive into the RAM 126, and the CPU 124 executes the OODB software, to form a history-operation managing unit in the RAM 126. The history-operation managing unit registers therein a job history, which enables to correct, change, and add the job history and an attribute value of macro. The OODB is implemented by using commercial-base software such as Cache™ and also freeware.

An operating system (OS) for use in this device includes Mac OS™, Windows™, Windows™ 200X Server, UNIX™, LINUX™, or any other appropriate OS. Moreover, the image forming apparatus 100 stores therein and executes application programs described in an object-oriented programming language such as C, C++, Visual C++, Java™, Java™ Script, Perl, and Ruby, which run on the OS.

The image processor 122 executes processes of filtering, extracting a text image, and extracting a halftone image to image data acquired by the scanner device 112. The image processor 122 further performs image processing based on various attribute values generated as a result of the execution, and issues a printing instruction to an engine controller 132. The engine controller 132 causes a printer 142 including a photosensitive drum, a developing device, and a fixing device to form an image through a serial bus or a parallel bus such as Universal Serial BUS (USB), Peripheral Component Interconnect (PCI), or Institute of Electrical and Electronics Engineers (IEEE 1284), according to the specifications of the image forming apparatus 100.

The image forming apparatus 100 also includes a facsimile controller 130, or a network interface card (NIC) 134, and a storage-device interface 136 having specifications such as Advanced Technology Attachment (ATA), serial ATA, ATA Packet Interface (ATAPI), and ATA-4.

The facsimile controller 130 converts the acquired image data into a facsimile format such as G3 and G4, and performs facsimile communications through a facsimile transmitter/receiver 138 such as a modem or Digital Service Unit (DSU)/Terminal Adaptor (TA) 140, based on a communication protocol such as T.4, T.6, and T.90, using an analog or digital line via a public telephone network or Integrated Services Digital Network (ISDN).

The NIC 134 is connected to a network 144 such as a local area network (LAN), a wide area network (WAN), or the Internet (INET) via an Ethernet™ cable such as 100 BASE-TX. The network 144 allows the image forming apparatus 100 to function as a remote printer or to provide services such as electronic mails under a protocol such as Simple Mail Transfer Protocol (SMTP) and Post Office Protocol (POP). The service such as electronic mails can also be transmitted or received by specifying a connection destination each time a dial-up connection is established based on Point-to-Point Protocol (PPP) through a modem but not through the NIC 134.

The image forming apparatus 100 is connected to a resource server 148 that provides a resource server function and to a shared storage 150 that provides a shared storage function via a public network such as the network 144, to perform various transactions. Furthermore, the image forming apparatus 100 includes a function capable of executing a server program such as Apache, which allows file transfer using File Transfer Protocol (FTP) based on specifications such as Request for Comments (RFC) 959 and HyperText Transfer Protocol (HTTP) based on specifications such as RFC 1945 and RFC 2616.

The image forming apparatus 100 also includes a function of executing programs described in the script language such as Java™ Script and in an interpreter language such as Visual Basic and Perl, and the function allows the job history to be executed as macro in each command line.

The storage-device interface 136 connects an external storage device such as a hard disk drive, an SD card, and a memory stick such as USB memory to the image forming apparatus, and converts original image data or the like acquired by the scanner device 112 into a file format such as PDF, and stores the converted image data in the storage device 146 such as a flexible disk, compact disk read only memory (CD-ROM), digital versatile disk (DVD), and magnet optical (MO) through a bus such as SCSI, USB, and PCI.

Figure 2:
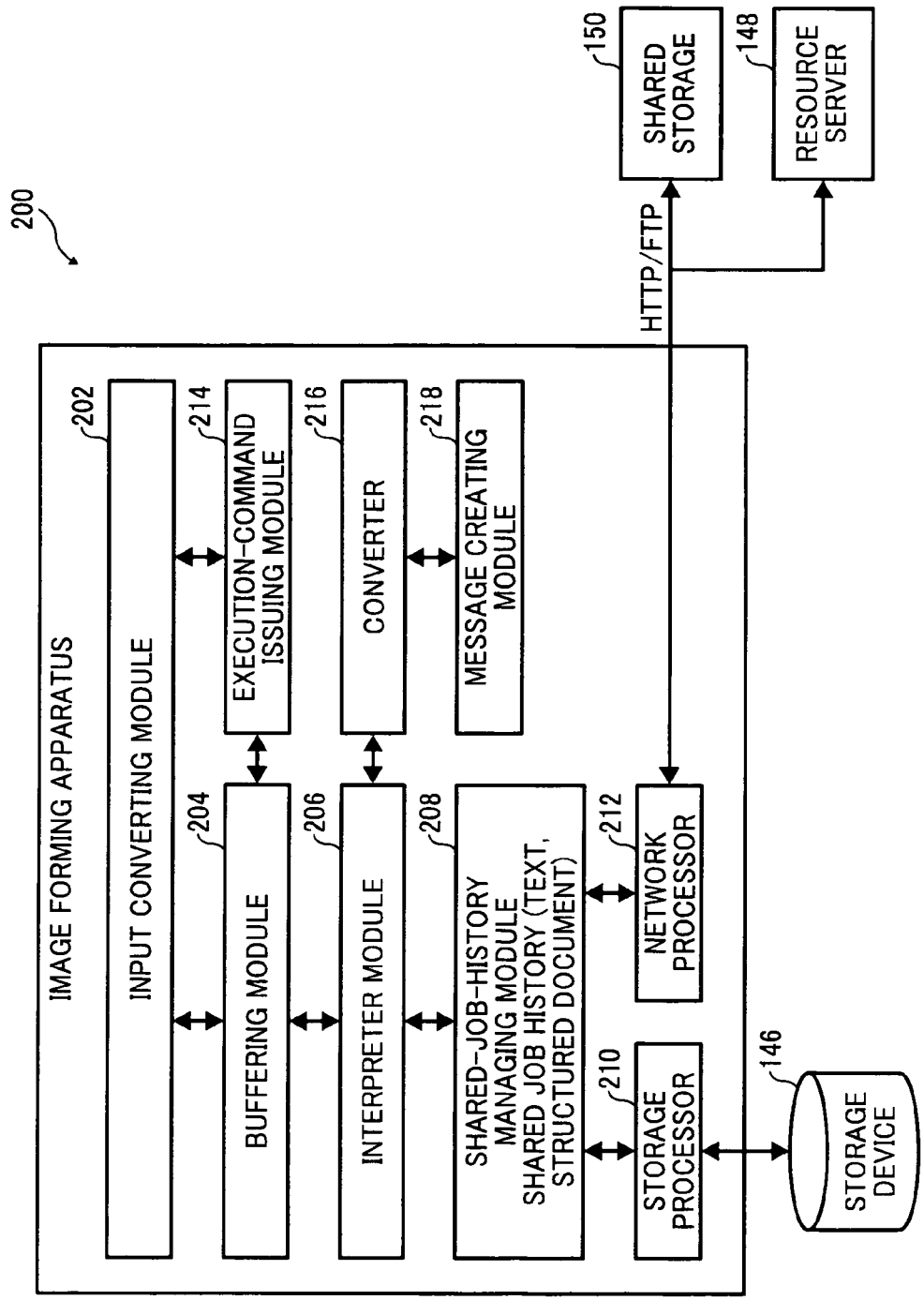
FIG. 2 is a block diagram of a software configuration of the image forming apparatus shown in FIG. 1.

FIG. 2 indicates a software configuration 200 of the image forming apparatus 100 according to the first embodiment. The image forming apparatus 100 includes an input converting module 202 incorporated in the user I/F 118. The input converting module 202 encodes an input signal corresponding to a job start operation into a device-specific code that can be executed by the image forming apparatus 100. More specifically, the job start operation is entered by the user through the job start button displayed on the operation panel as a touch panel, input keys, or a start button. The image forming apparatus 100 includes a display unit such as a cathode ray tube (CRT), a liquid crystal display (LCD), and photodiode (PD) which support video graphics array (VGA). When the image forming apparatus 100 includes browser software such as Internet Explorer™, Netscape Navigator™, Mozilla, and Opera, a user entry may be performed by using a pointing device such as a mouse through a software button displayed on a display.

Specification of a job type and input data which are encoded by the input converting module 202 are temporarily buffered by a buffering module 204 including a buffer memory and a controller. The data stored in the buffering module 204 is read by an interpreter module 206. The interpreter module 206 reads the encoded data, refers to a converter 216, and compares a value registered in the converter 216 with a read value. Furthermore, the interpreter module 206 acquires a text code, a variable name, and variable type declaration registered in a record which matches the read value in the comparison, and sequentially converts the encoded data into the text code. If an encoded value corresponds to an Arabic number, the interpreter module 206 acquires a text code of a corresponding Arabic number, connects the text code to other text codes, and creates a job history.

Each encoded text code is transferred to a shared-job-history managing module 208 that includes a text parser, an HTML parser, an XML parser, and a text editor, an HTML editor, or an XML editor. The shared-job-history managing module 208 creates a shared job history, and stores the shared job history in an appropriate recording area through a storage processor 210 or a network processor 212. The shared job history can be created as a plain text or as a structured document such as HTML or XML by using an appropriate template or the like.

When the user instructs to store the shared job history in the storage device 146 such as an SD card, a memory stick, and a card type HDD, the image forming apparatus 100 transmits the job history to the storage processor 210, to be stored in the storage device 146 in an appropriate file format such as comma separated value (CSV), HTML, and XML. The stored shared job history can be used by the user afterward when the image forming apparatus 100 or other image forming apparatus executes a predetermined process by using the shared job history.

Furthermore, in other examples, the created job history can be uploaded to the shared storage 150 by using a network corresponding to an instruction from the user or by using the FTP protocol or HTTP protocol. The shared storage 150 can be formed as a storage server. The shared storage 150 receives a job history request from the image forming apparatus 100, and searches for a registered job history corresponding to a job-history user ID according to a result of authentication of a user ID and password or the like. Thereafter, the shared storage 150 transmits the obtained job history as a job history list to a request source by using the FTP protocol or the HTTP protocol.

It is noted that the storage processor 210 and the network processor 212 form the shared-job-history storage unit together with a software unit that supports an appropriate transfer protocol.

When executing a job by using the shared job history created by other image forming apparatus and if the user entry received by the input converting module 202 indicates a job execution instruction, the image forming apparatus 100 informs an execution-command issuing module 214 of the instruction, and transmits the data stored in the buffering module 204 to a job-specific functioning unit such as the facsimile controller 130 and the engine controller 132, and causes the job-specific functioning unit to start executing the job. If the job is not found in the converter 216, the image forming apparatus 100 calls a message creating module 218 to create an error message and display the created message on a display panel or a display unit.

As for a message to be created, a previously created message can be read and displayed, or a message can be created as a structured document such as HTML and displayed on a display unit by using the browser software or the like. When the processing function of the image forming apparatus 100 is updated, the converter 216 is updated by addition or overwrite of new data, so that the data can be converted into a text code instructing the image forming apparatus 100 to execute a latest function.

The image forming apparatus 100 which is the request source of the job history downloads a desired job history from a received list, transfers read-out text code, variable type declaration, operating conditions, and device environment to the interpreter module 206, and displays an operation screen corresponding to the job type. The image forming apparatus 100 registers read-out various data in the buffering module 204, displays the read-out data on the display screen, and waits for depression of a job execution button by the user. During waiting time, the user can deal with a user's desired job request upon the processing simply by operating the input key or the touch panel to correct the various data displayed on the display screen.

FIG. 3 indicates a data structure of a job history table 300 created by the image forming apparatus 100. Registered in the job history table 300 is a record such as a job history number created for each job-history identification value (ID value) 302. Registered in the record a field corresponding to the job-history ID value 302. The field includes a timestamp 304 registering therein a date on which an operation is performed, and a job-function ID value 306 performed by the user. Moreover, the job history table 300 registers therein a program ID value 308 such as a program name to execute the function, a program version 310, operating conditions 312 such as a paper size, printing conditions, print copies, and a facsimile number, a hardware (HW)-in-use ID value 314, an HW model-number ID value 316, and a user ID value 318.

The data registered in the record of the job history table 300 as shown in FIG. 3 corresponds to a type of text code or of device-specific code to be used by the interpreter module 206, and is encoded into Japan Industrial Standards (JIS) code or Shift JIS code, to be registered in the storage device 146 or the shared storage 150.

If the data structure stored as an operation log has data contents sufficient enough to form the shared job history as shown in FIG. 3, the image forming apparatus 100 reads an operation log from the operation log, not from the buffering module 204, so that the shared job history can also be created. In the example as shown in FIG. 3, the device environment such as the hardware environment and the software environment is further added as data for smooth use of the shared job history in other image forming apparatuses.

When the shared job history created by other image forming apparatus is used to re-execute a job, the image forming apparatus 100 reads a text code of the shared job history and searches the converter 216. As a result of search, if the conditions corresponding to the job history are registered, the image forming apparatus 100 acquires the registered text code and the variable type declaration, converts them into corresponding device-specific codes, and sequentially executes the processes according to the job history. If the image forming apparatus 100 uses the job history registered by itself, there is no particular need to provide the converter 216. However, if the job history is shared by other image forming apparatuses having different settings or of different types, provision of the converter 216 allows sharing of the job history corresponding to a difference between models or to a difference between settings.

Figure 4:
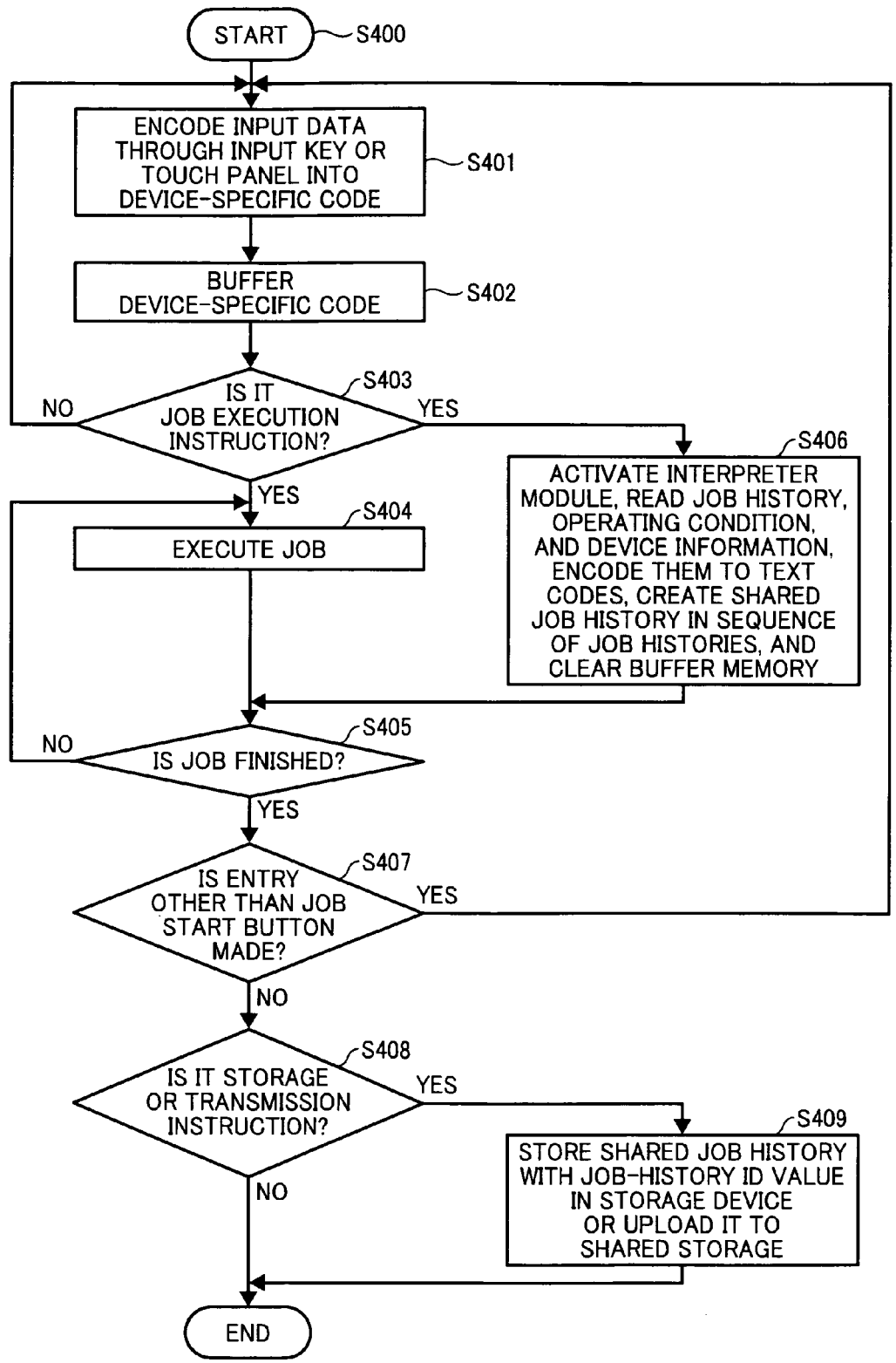
FIG. 4 is a flowchart of a procedure for creating and storing a shared job history.

FIG. 4 indicates a flowchart of a creating and storing process of the shared job history executed by the image forming apparatus 100. The process shown in FIG. 4 is implemented by starting at step S400, and at step S401, the input converting module 202 receives a job-history creation instruction from the user, and encodes input data through the input key or the touch panel into a device-specific code. At step S402, the buffering module 204 buffers the device-specific code, and at step S403, the execution-command issuing module 214 determines whether the user depresses the job start button such as "start". If the job start button is not depressed (no), the process is branched to step S401, and encoding and buffering of the next input data are repeated. It is noted that, at step S401, the image forming apparatus 100 executes the process as a background process even if the user does not particularly explicitly instruct the execution, and can also collectively encode buffered device-specific codes in response to reception of a shared-job-history registration instruction explained later.

Thereafter, in the image forming apparatus 100, at step S403, if the execution-command issuing module 214 determines that the job execution button is depressed (yes), buffered code (execution command) is issued to execute the job at step S404. At the same time, at step S406, the interpreter module 206 is activated, the device-specific codes is encoded into text codes, and the shared-job-history managing module 208 describes the text codes in the sequence of the job histories. When the description is completed, the content of the buffer memory is cleared to be in a standby state for the next entry, and then the process is branched to step S405. In the example as shown in FIG. 4, the interpreter module 206 and the shared-job-history managing module 208 are activated to encode the device-specific code, which is stored in the buffer memory of the buffering module 204 at that time, into the text code and add the encoded text code to the shared job history. When the process is ended, the buffer memory managed by the buffering module 204 is cleared so as to handle subsequent entries through the input key or the operation panel.

At step S405, it is determined whether the sequence of the jobs entered by the user is finished, and when the sequence of the jobs is not finished (no), the process is returned to step S404, where the job is finished. On the other hand, when the job is finished at step S405 (yes), the interpreter module 206 is activated, and device information such as the job history, the operating conditions, the program version, and the HW model name is read from the buffer, to create a text code or a structured document.

Furthermore, at step S407, it is determined whether an entry is made by the user through any input device other than the job start button. When it is determined at step S407 that the entry is made through the input device other than the job start button (yes), the process is branched to step S401, and the above explained processes are repeatedly executed. When it is determined at step S407 that the entry is not made through the input device (no), the process is branched to step S408.

At step S408, it is determined whether the user instructs storage or transmission. When it is detected at step S408 that the user depresses or touches a "register job history" button corresponding to the shared-job-history registration instruction arranged on the operation panel or displayed on the touch panel (yes), then at step S409, the job-history ID value is attached to the shared job history to be stored in the storage device or to be uploaded to the shared storage 150 through the network 144. Then, the process is branched to step S410, where the process is ended.

On the other hand, when the user does not instruct to register the job history at step S408 (no), the process is branched to step S410, where the process is ended. If the user does not instruct the storage or the transmission, at step S410, the image forming apparatus 100 may store a specified device-specific code, of buffered device-specific codes, in a preset storage area without activating the interpreter in order that the image forming apparatus 100 registers therein the job history as the operation log of its own device.

Figures 5, 6:
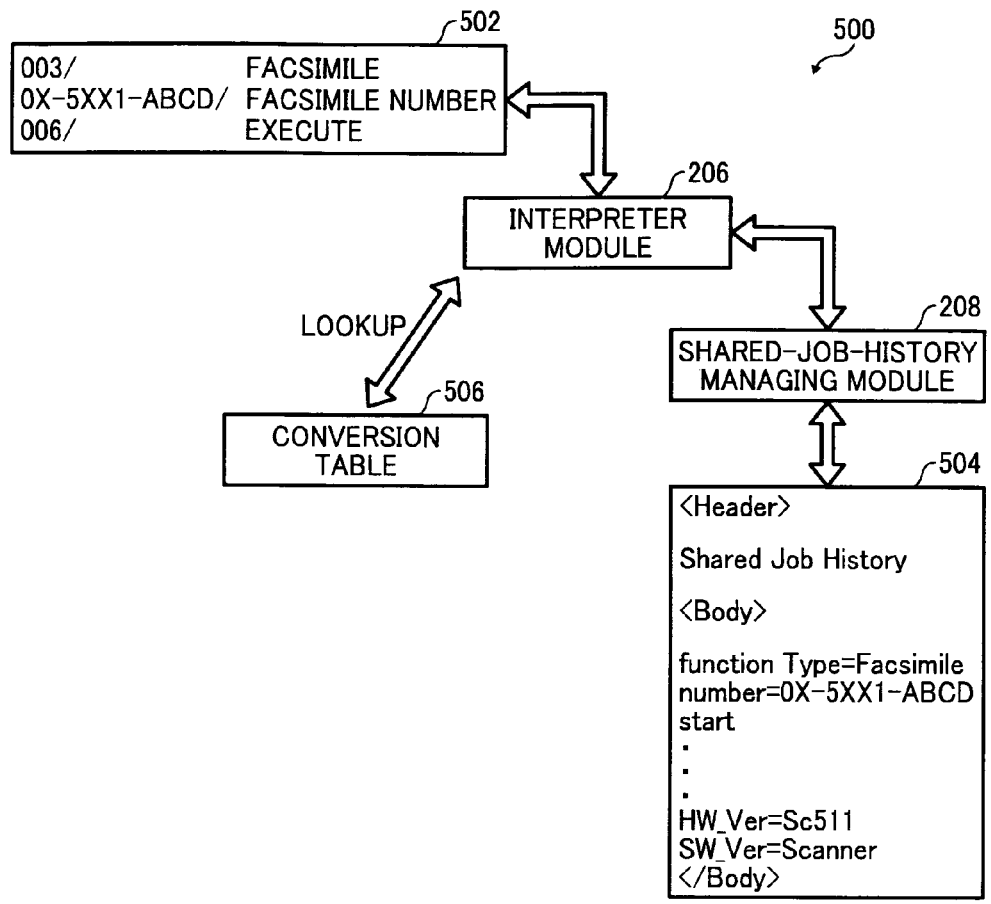
FIG. 5 is a diagram for explaining a process of creating a shared job history as a text code or a structured document.
FIG. 6 is a schematic of an example of a conversion table.

FIG. 5 indicates an example of a creating process 500 of a shared job history created as a text code or a structured document executed by the image forming apparatus 100. The example is explained below based on a case in which the image forming apparatus 100 creates and registers an operation sequence of the case of executing facsimile transmission, as a shared job history.

When the shared job history is to be created, the image forming apparatus 100 activates the interpreter module 206, and receives a function ID value "003" and a facsimile number which indicate that the facsimile function is specified in a buffer memory 502 managed by the buffering module 204, and also receives an execution ID value "006" indicating an execution instruction command. Then the image forming apparatus 100 buffers data input through the input key or the operation panel after the facsimile operation is started or a shared-job-history creation instruction is received. The image forming apparatus 100 transfers the data in the buffer memory 502 to the interpreter module 206. The interpreter module 206 can sequentially perform an interpreter process on the device-specific code according to the job input through the input key or the operation panel.

Other example can be configured to receive a shared-job-history registration instruction, buffer subsequent instructions until depression of the job start button, collectively convert contents input through the input key or the operation panel into a shared job history, and execute a registering process. If the buffered job contents are sequentially converted, there is no need to buffer all the operations performed by the user, and thus, the memory resources can be saved. However, if the user does not eventually create the shared job history, the hardware resources such as memory resources are wasted. Moreover, the sequential converting process always requires an overhead or the like for the converting process upon correction and input processes. There is also a possibility that the correcting process due to a user's erroneous operation may be reflected to the shared job history.

Therefore, the image forming apparatus 100 according to the first embodiment is preferably configured to start buffering at the time of receiving a shared-job-history registration instruction or at the time of starting a job, receive the shared-job-history registration instruction, and perform the converting process on the buffered job history. The image forming apparatus 100 detects depression of the job start button, and can thereby execute an encoding process by each job history after the job is started, at each interval between depressions of the job start button.

The interpreter module 206 manages a conversion table 506 being the converter 216, as a table type such as a lookup table, stored in the ROM 128 or the like. Furthermore, the interpreter module 206 looks up a function ID value, a facsimile number, and an execution ID value registered in the conversion table 506, and converts a device-specific code except the facsimile number or the like into a text code. The converted text code is transferred to the shared-job-history managing module 208, and the shared-job-history managing module 208 inserts the text code into a specified location of a previously stored template. In other examples, the shared-job-history managing module 208 can create header, body, and text code upon reception of the instruction, and also create a shared job history in a structured document format such as HTML and XML.

The interpreter module 206 and the shared-job-history managing module 208 can be implemented by using an appropriate programming language. If both the modules are implemented by using Java™ or Java™ Script, the server software such as Apache included in the image forming apparatus 100 can also be used, which allows sharing of software resources, and this can lead to resource saving of the software resources. Furthermore, the device-specific codes shown in FIG. 5 are only examples, and thus decimal notation is not necessarily used, but any other notation format such as binary notation or hexadecimal notation may be used.

A created shared job history 504 is explained as HTML in the example of FIG. 5, however, any plain text file, and CSV format, space-delimited format, and tag-delimited format text files may be used or XML format may also be used if the text file is a shared file capable of resolving a difference between models and of sharing the job history. As shown in FIG. 5, the shared job history 504 describes a shared job history in <header>, and describes the job history converted from the device-specific code into the text code in a portion of <Body>. Inserted into the portion of <Body> are text codes such as "start" as the job execution code "006" which indicates that the codes are converted by the interpreter module 206 and the job execution button is depressed by the user. In the shared job history 504, when the user performs a series of job sequence, corresponding job histories are inserted along the job sequence.

Thereafter, the created shared job history 504 is stored in the storage device such as an SD card or a memory stick to be used for operations by other image forming apparatuses. To use the created shared job history 504 for other image forming apparatuses, it may be transferred in a file by using the HTTP protocol or the FTP protocol, and stored in the shared storage 150.

FIG. 6 indicates an example of the conversion table 506 as explained with reference to FIG. 5. Registered in the conversion table is a text code 602 corresponding to a device-specific code 600, and it is possible to acquire the text code 602, used for canceling out the difference between models, corresponding to the device-specific code 600. It is also possible to register a variable name and variable type declaration or the like to execute the function, in the conversion table 506. More specifically, the variable name and the like correspond to each function and to the type of programming language used to implement the interpreter module 206 and the shared-job-history managing module 208. Furthermore, the data such as the paper size, number of copies, and the facsimile number correspond to setting of a model that the user wants to use, and the data may be converted into text code, JIS code, Shift JIS code, or the like.

On the other hand, in the image forming apparatus 100, when the conversion table 506 is used to generate a device-specific code, the text code acquired by the shared-job-history managing module 208 is transferred to the interpreter module 206. The interpreter module 206 sequentially decodes the text code to the device-specific code 600, transfers decoded codes as a sequence of the device-specific codes 600 to a buffering unit, and causes a display related to an address of the corresponding buffer memory 502 on the operation panel to be displayed. Therefore, the input data created by other image forming apparatuses can also be reproduced with high precision while the user visually checks it.

In one example, if detecting the text code of "start", the interpreter module 206 sometimes skips the process of converting the text code corresponding to the job execution code by referring to the conversion table 506 according to an example. The image forming apparatus 100 sends the result of conversion before the job execution code is received to the buffering module 204, and waits for reception of the job execution code. Thereafter, if there is any other subsequent job, the same processes are repeated until no more subsequent job is left.

In another example, when detecting the job execution code, the interpreter module 206 converts, by referring to the conversion table 506, the job execution code into a device-specific code indicating waiting until the job start button is depressed. If the another example is employed, as the conversion table 506, different conversion tables 506 can also be used when the shared job history 504 is created and when the shared job history 504 is decoded into the device-specific code. Moreover, when the shared job history 504 is decoded into the device-specific code, in the example shown in FIG. 6, the text code of "start" is once converted into the device-specific code "006" by using the same conversion table 506.

Thereafter, the interpreter module 206 detects the conversion thereof into the device-specific code "006", and can thereby re-decode the device-specific code "006" to the wait code.

Figure 7:
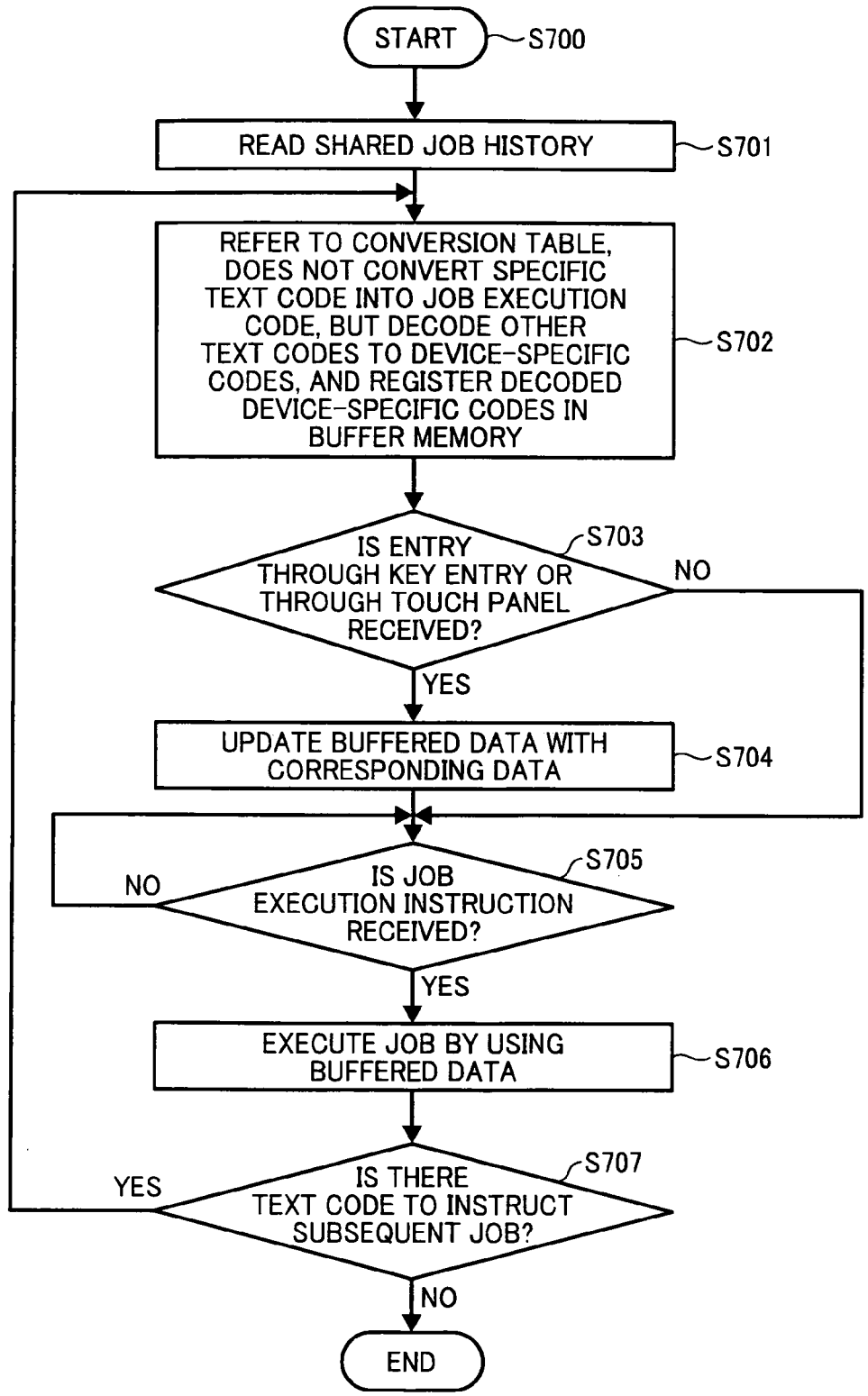
FIG. 7 is a flowchart of a process for executing a job by reading a shared job history.

FIG. 7 is a flowchart of an example of a process such that the image forming apparatus 100 reads the shared job history and executes the job. The process of FIG. 7 is implemented by starting at step S700 when the user instructs to read the job history through the operation panel or the like, and at step S701, a text document or a structured document is read. In this case, the image forming apparatus 100 activates the programming language used to implement the interpreter module 206, such as Visual Basic for Application (VBA), Java™ Script, and J Script, reads the shared job history 504, and executes the process. At step S702, by referring to the conversion table 506, a specific text code corresponding to the job execution code in the shared job history 504 is not converted into a device-specific code, but other text codes therein are decoded to device-specific codes, and the decoded device-specific codes are registered in the buffer memory 502. Upon performance of the process, data required for functional process is also acquired from the shared job history. If it is required that the data such as the variable name, facsimile number, paper size, number of copies is converted into the JIS code or Shift JIS code, the interpreter module 206 performs conversion corresponding to the setting of the image forming apparatus 100.

When the process at step S702 is ended, the job type and accessed data in the shared job history 504 are registered in the buffer memory 502 of the buffering module 204 in the image forming apparatus 100. At step S703, it is determined whether any entry as key entry or through the touch panel other than the job start button is received. When the entry is received through the input device (yes), at step S704, a corresponding address value in the buffer memory 502 is updated with the input data. Thereafter, at step S705, if the job execution instruction is not provided by depressing the job start button (no), then the process is branched to step S705, where depression of the job start button is waited.

When the depression of the job start button or the like is detected at step S705 (yes), at step S706, the buffered data is used to start executing the job. If there is no entry other than the job start button through key entry or the touch panel (no), the process is branched to step S705 without any change, where depression of the job start button is waited.

After the job is started, at step S707, the image forming apparatus 100 causes the shared-job-history managing module 208 to check whether any other text code such as "start" exists in the lower order than the already executed job, and determines whether there is any subsequent job based on the result of checking. If a subsequent job exists (yes), the process is branched to step S702, where the text code of the subsequent job starts to be decoded, and the processes from step S703 to step S706 are repeated. On the other hand, if it is determined at step S707 that there is no subsequent job (no), the process is branched to step S708, where the job sequence is ended.

The execution of the processes allows the image forming apparatus 100 to execute the job with minimum steps of input operation while using the shared job history 504 created by some other image forming apparatus. In the process as shown in FIG. 7, data of a subsequent job can be read and decoded during execution of a precedent job. Therefore, even if the shared job history 504 is used, a delay of time required for key entry operation can be minimized as compared with the process in other image forming apparatus, and thus operation efficiency is further improved.

Figure 8:
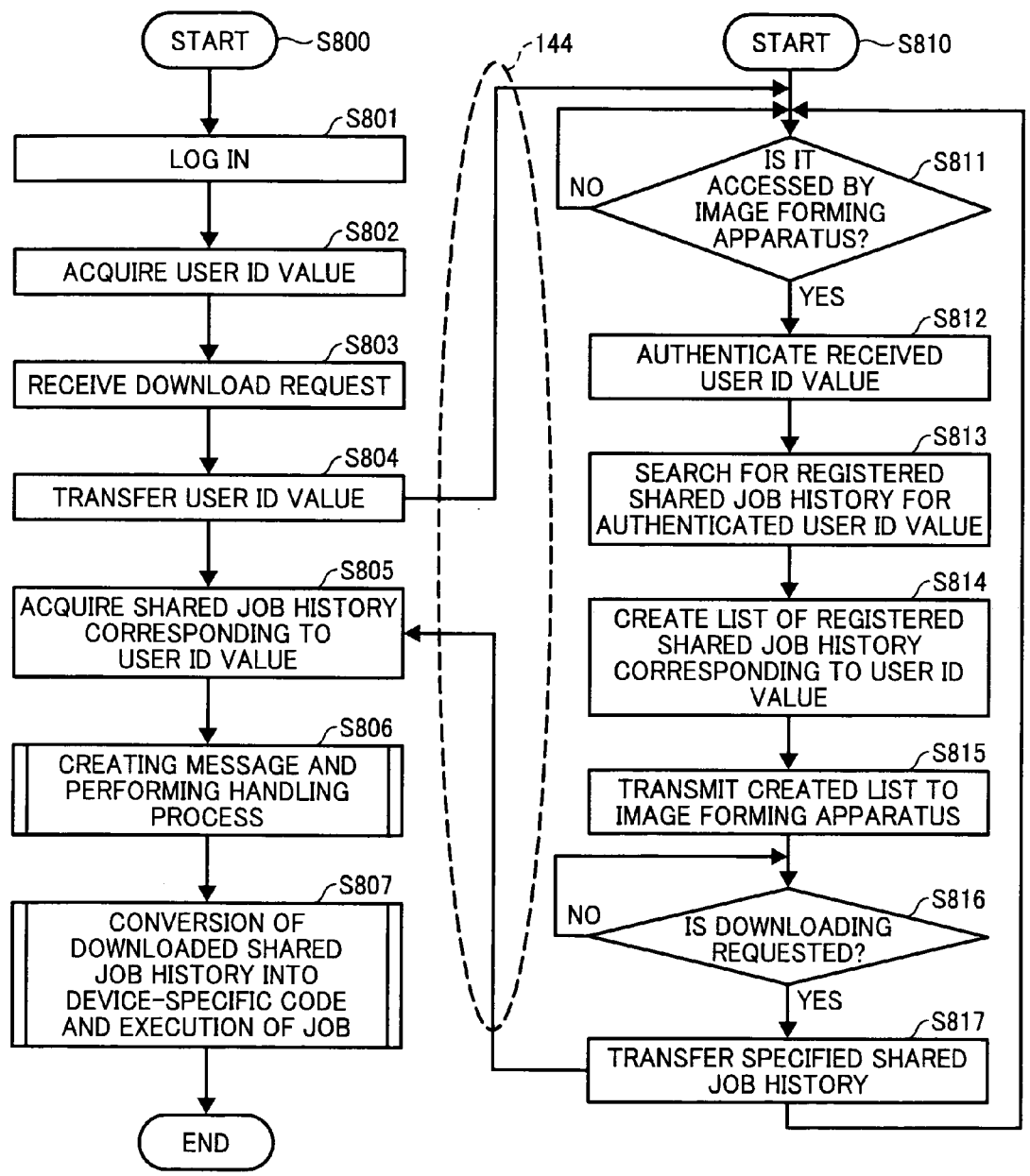

FIG. 8 is a flowchart of the process when the shared job history 504 is downloaded from the shared storage 150 formed of a storage server or the like through the network 144. The processes from step S800 to step S808 are executed by the image forming apparatus 100, while the processes from step S810 to step S817 are executed by the shared storage 150. The shared storage 150 can be formed as an FTP server or an HTTP server, and file transfer is not particularly limited if its function corresponds to a file transfer function used by the shared storage 150, such as the FTP protocol or the HTTP protocol. If other image forming apparatus acquires the shared job history 504 from the memory stick or the SD card but not through the network 144, by performing bus communication based on specifications such as PCI but not through Ethernet™ as communication infrastructure, the same process can be executed.

The image forming apparatus 100 starts the process at step S800, and, at step S801, displays a login screen or the like and executes a login process prompting the user to enter the user ID and password or the like. At step S802, the image forming apparatus 100 acquires a user ID value such as the user ID and the password from the login screen by user entry. If the user who creates the shared job history can be identified by using any other function, the input process for the user ID value at step S801 and step S802 is not particularly needed.

At step S803, the image forming apparatus 100 receives a download request of the shared job history 504 by a key entry or an entry through the touch panel. At step S804, a user ID value or any other ID value capable of specifically identifying the user is transferred to the shared storage 150. At step S805, the shared job history 504 transmitted from the shared storage 150 and created by the user up to that time is acquired through downloading. At step S806, the downloaded shared job history 504 is analyzed to check whether the shared job history 504 contains any process that cannot be executed under the environment of the image forming apparatus 100. If the process cannot be executed without change, processes of creating a message and prompting the user to perform a handling process are executed. The process at step S806 will be explained in detail later.

When the image forming apparatus 100 used by the user can provide a specified process by using the shared job history 504 under default environment, at step S807, a shared job history desired to be downloaded from a downloaded table is specified and a download request is made, the specified shared job history is downloaded, the job is executed by using the process explained with reference to FIG. 7, and the process is ended at step S808.

On the other hand, at step S810, the shared storage 150 starts the process and starts the process for waiting an access from the image forming apparatus 100 as daemon or background service. The shared storage 150 continuously monitors whether it is accessed by the image forming apparatus 100 at step S811. If it is determined that it is accessed by the image forming apparatus 100 (yes), then authentication of the received user ID value or the like is executed at step S812. At step S813, shared job histories registered by using the authenticated user ID value are searched, to create a list of searched shared job histories 504 at step S814.

At step S815, the shared storage 150 transmits the created list to the image forming apparatus 100, and, at step S816, waits for a download request of a specified shared job history 504. At step S816, if the download request is received (yes), the specified shared job history 504 is transferred at step S817, the process is returned to step S811, where subsequent access request is waited. At step S816, if the download request is not received (no), the download request is waited until timeout occurs.

Figure 9:
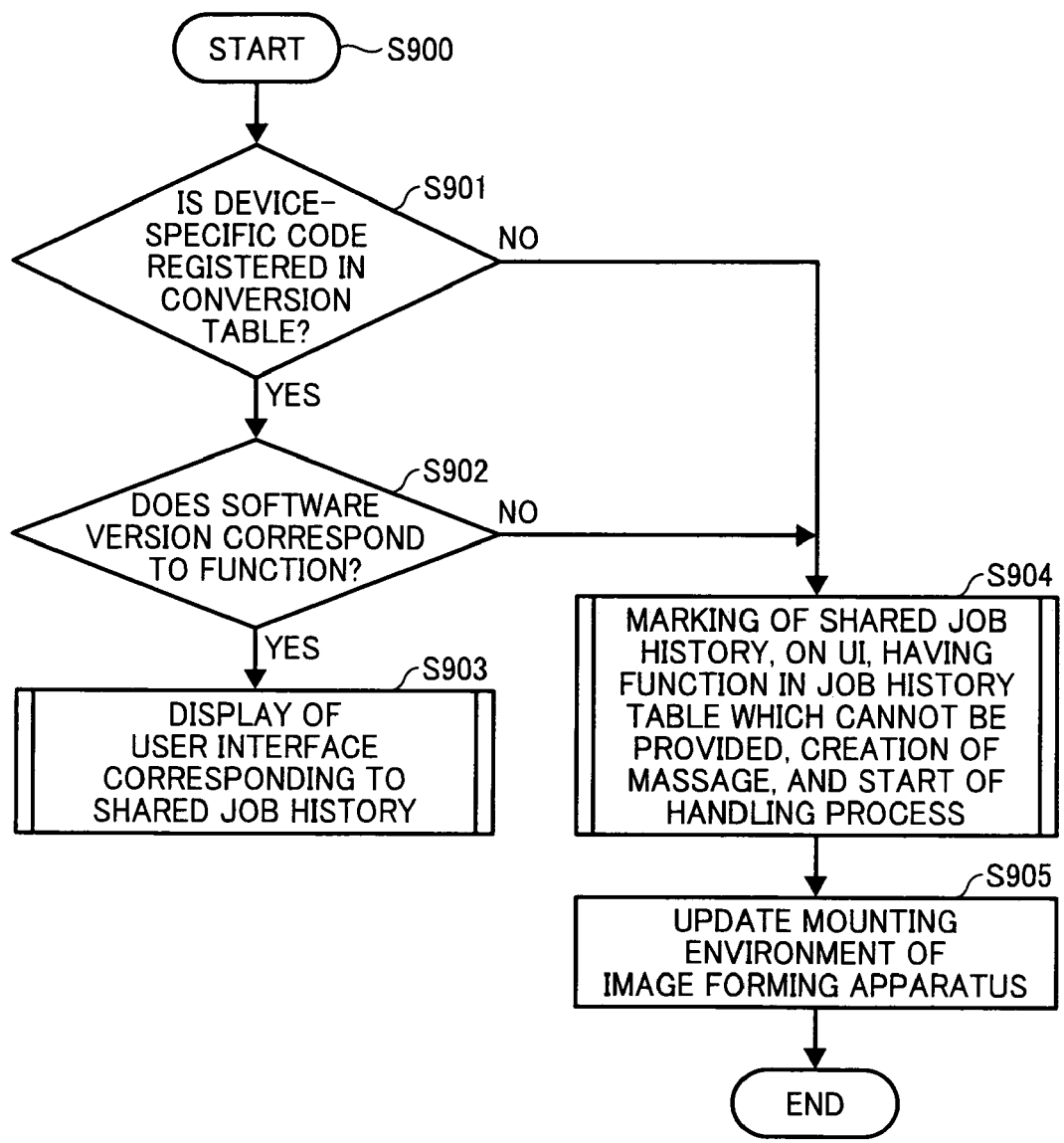
FIG. 9 is a flowchart of a process for creating a message and performing a handling process.

FIG. 9 is a flowchart of an example of creating a message and of a handling process (hereinafter, "handling process") at step S806 of FIG. 8. The handling process shown in FIG. 9 is started at step S900, and at step S901, it is determined whether the device-specific code corresponding to the text code described in the shared job history 504 is registered in the conversion table 506 stored in the image forming apparatus 100 which uses the shared job history 504. When it is determined at step S901 that the device-specific code is not registered therein (no), this indicates that the image forming apparatus 100 cannot provide the requested function under its mounting environment. Therefore, the process is branched to step S904, where a shared job history having a function, which cannot be provided, in the job history table is marked on a user interface (hereinafter, "UI"), and at the same time, the process of creating a message is started, and either ordering of lacking hardware or updating of software is also started.

In the image forming apparatus 100, after the process is ended, the process is branched to step S905, where the process for updating the mounting environment of the image forming apparatus is executed. More specifically, the ordering of the hardware or the downloading of the software, and resetting are executed, and the process is branched to step S906, where the handling process is ended. A software version can be corrected by downloading data through a network. However, because a time may be required or there may be a conflict, the hardware is corrected after the handling process is ended and the image forming apparatus finishes the process, which leads to resetting or error-ending. Furthermore, in other examples, after the order of lacking hardware is sent or the software is downloaded, an executable job is selected from among a plurality of jobs registered in the shared job history 504, which enables the user to also select an execution.

On the other hand, if it is determined at step S901 that the function is registered in the conversion table 506 (yes), at step S902, it is further determined whether a version of plug-in software or the like corresponds to the function by looking up the configuration information registered in ROM 128, RAM 126, or NVRAM (not shown) of the image forming apparatus 100. If it is determined at step S902 that the software version does not correspond to the function (no), the process is branched to step S904. On the other hand, if it is determined at step S902 that the software version corresponds to the function (yes), the process is branched to step S903, where the process is branched to step S807 explained with reference to FIG. 8 and the UI corresponding to the shared job history 504 is displayed on the operation panel of the image forming apparatus 100, and the process using the shared job history 504 is executed.

FIG. 10 indicates an example of UI 1000 displayed in the handling process at step S904 of FIG. 9. In the example of the UI as shown in FIG. 10, the items registered in the job history table 300 are displayed together with number 1002 for the acquired shared job history 504 and registered date 1004. Job-history contents 1006 are also displayed to learn the job history. A scroll bar 1008 is provided on the UI 1000 to prepare for a case where a plurality of shared job histories 504 is available but all of them cannot always be displayed on the screen of the operation panel.

Displayed on the UI 1000 is a caution mark 1010 indicating a job history which cannot be provided because of the mounting environment of the image forming apparatus 100 at that time. Furthermore, gray-out is provided to a corresponding shared job history 1012 so that the user can easily recognize it. Moreover, a message 1014 is displayed in the lower side of the UI 1000. In the example of FIG. 10, the shared job history 1012 for the image forming apparatus cannot be used because a facsimile modem for implementing a facsimile function specified by the shared job history 1012 cannot be shared.

Displayed in the message 1014 is a reason why the function of the shared job history 1012 cannot be provided, and measures to solve the trouble are also displayed therein. Moreover, an entry area 1016 indicated by "Here for solution" is also displayed therein to further precede the handling process for handling the request of the user. The entry area 1016 leads the user to the process which enables to use the shared job history 1012.

Some other reasons that the acquired shared job history cannot be used are incompatibility between hardware devices, occurrence of conflict in a hardware device itself, incapability of sharing an optional function such as stapling or punching, and difference between software versions, however, the reasons are not limited thereby. The message 1014 is created and displayed on the UI 1000 in the following process. More specifically, when data for the shared job history 1012 is analyzed upon activating the interpreter module 206 by the image forming apparatus 100 and any function that cannot be handled is found through checking the data, a text file describing a function incapable of being handled and the way to solve the trouble is read by searching the NVRAM (not shown) to create and displays the message 1014 on the UI 1000.

Figure 11:
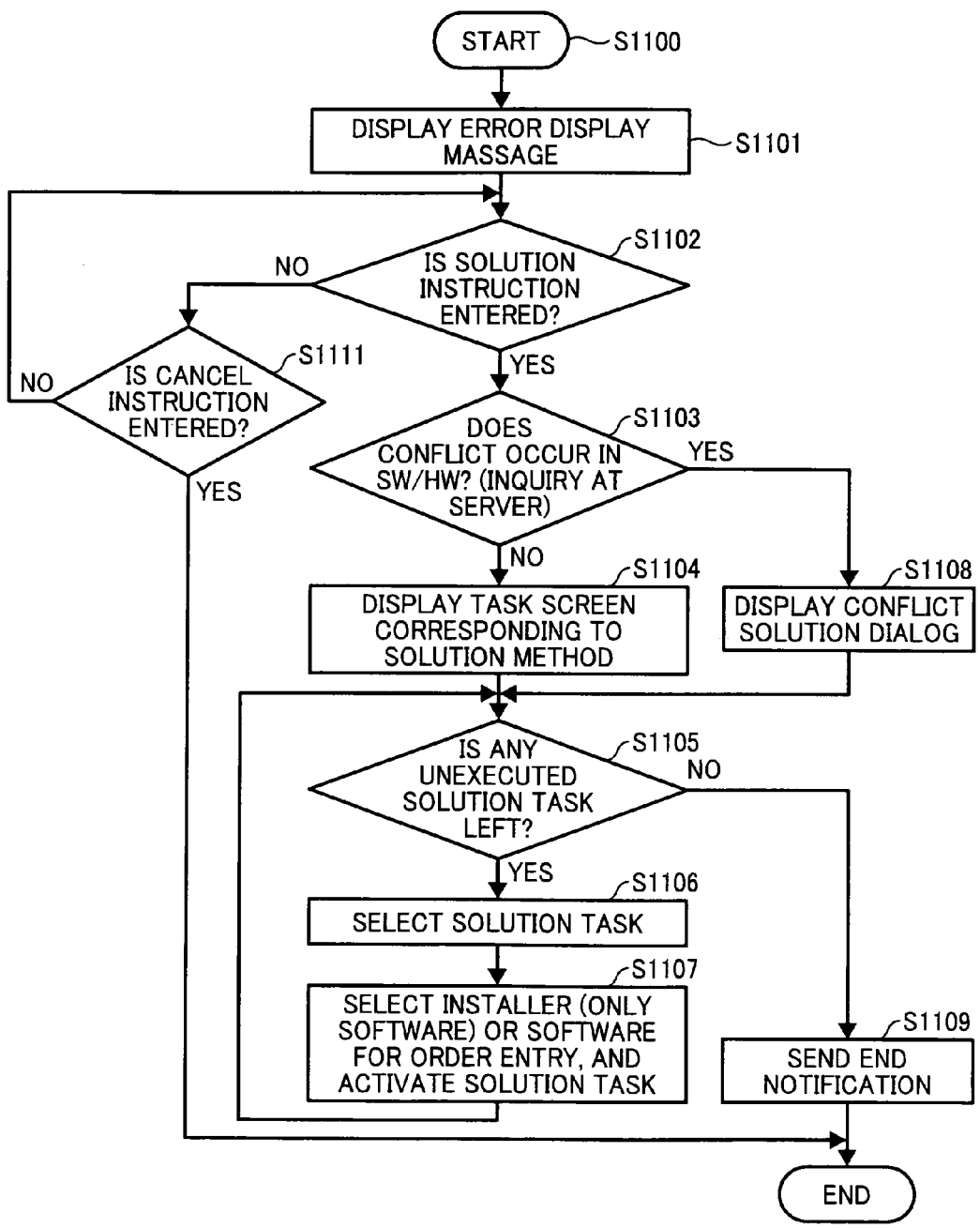
FIG. 11 is a flowchart of a procedure of the handling process corresponding to the message.

FIG. 11 is a detailed flowchart of an example of the handling process corresponding to the message created at step S904 of FIG. 9. The process as shown in FIG. 11 is started at step S1100, and a message is displayed at step S1101. At step S1102, it is determined whether a solution instruction is entered through the entry area set as "Here for solution". If the solution is instructed (yes), the process is branched to step S1103. On the other hand, when the solution instruction is not received at step S1102 (no), at step S1111, it is further determined whether a cancel instruction is entered through an entry area "Cancel".

If it is determined at step S1111 that the cancel instruction is received (yes), because the user does not desire the process using the shared job history 1012 at that time, the process is branched to step S1110, where the process itself using the shared job history is stopped, and the image forming apparatus 100 is returned to a status of waiting for an entry. On the other hand, when the cancel instruction is not received at step S1111 (no), the process is returned to step S1102 and an entry is waited until the timeout occurs.

On the other hand, at step S1103, because the user instructs the solution, it is determined for each software (SW) or hardware (HW) whether a conflict occurs by referring to the resource server 148. The reason why the occurrence of a conflict is referred to at step S1103 is because the occurrence of the conflict often requires any solution method other than a method of simply adding the HW or the SW to the configuration. In the example, the resource server 148 stores therein a resource database that registers therein HW or SW which does not cause a conflict, or registers therein upward-compatible HW or SW for each HW and SW which are registered in the resource server. When receiving a solution request and data for mounting environment of the image forming apparatus 100 therefrom, the resource server 148 specifies a model of HW or SW which has to be solved, searches for HW and SW corresponding to the function or for upward-compatible HW and SW which do not cause a conflict by looking up the resource database, and returns the search result to the image forming apparatus 100.

In the image forming apparatus 100, the data received from the resource server 148 is displayed on the operation panel, which enables the user to select a solution task. When it is determined at step S1103 that the conflict does not occur (no), at step S1104, a task screen is displayed to lead the user to the solution method. On the other hand, if it is determined that the conflict occurs (yes), at step S1108, a conflict solution screen (conflict solution dialog) is displayed so as to lead the user to relief of the conflict.

At step S1104, in the image forming apparatus 100, a task screen with a task to use the shared job history 1012 is displayed on a display screen, the process specified on the task screen is executed, and a correction process for the mounting environment is instructed so that the shared job history 1012 can be used. On the other hand, at step S1108, in the image forming apparatus 100, the process displayed on the conflict solution screen is specified and the correction process for the mounting environment of the image forming apparatus 100 is instructed.

After the process at step S1104 or at step S1108 is executed, at step S1105, in the image forming apparatus 100, it is determined whether any unexecuted solution task is left. If any unexecuted solution task is left (yes), a task is selected at step S1106. At step S1107, an installer (only software) or software for order entry is selected and is started, a solution task is activated, and the process is returned to step S1105, where the process is repeated. If there is no unexecuted solution task left (no), the process is branched to step S1109, where process end is informed to the user, and the process is ended at step S1110.

FIG. 12 indicates an example of a task screen 1200 displayed at step S1104 of FIG. 11. The task screen 1200 displays thereon a solution task 1204 corresponding to the data received from the resource server 148 in association with a solution task number 1202 and an action 1206. The user selects an action for each solution task to activate the solution task, and the mounting environment of the image forming apparatus 100 is corrected. As shown in FIG. 12, it is determined that a facsimile modem is functionally missing, and thus the user selects an order of No. 1: FX 2581. Also, as shown in FIG. 12, task 1 indicates an example of online ordering of the facsimile modem FX 2581 corresponding to the function, and task 2 indicates that an installer of FAX_BASIC_Ver.1 being driver software can be activated.

FIG. 13 indicates an example of a conflict solution screen for solving a conflict at step S1103 of FIG. 11. A conflict solution screen 1300 shown in FIG. 13 is displayed when data is received from the resource server 148 and it is informed that the data may cause a conflict. Displayed on the conflict solution screen 1300 is that if the shared job history 1012 indicated by an ID value No. 2 is set usable, a conflict may occur between the shared job history and hardware used for a shared job history with an ID value No. 4. The user determines, for example, use frequency of a history or importance thereof by referring to the display of the conflict solution screen 1300, and can select a subsequent process by using either one of the entry areas indicated by "Here for solution" and "Cancel".

The user touches the entry area indicated by "Here for solution" or clicks thereon through a mouse or an event handler on the conflict solution screen 1300 of FIG. 13, and a task execution screen 1302 is displayed. Displayed on the task execution screen 1302 is a solution task 1304 which can be specified, and checkboxes or buttons 1306 are provided to select a solution task. The user selects a solution task on the task execution screen 1302, depresses an execution button 1308, causes the selected solution task to be executed by touching or clicking on the task, resolves the conflict, and controls the image forming apparatus by using the shared job history which should be used.

Figure 14:
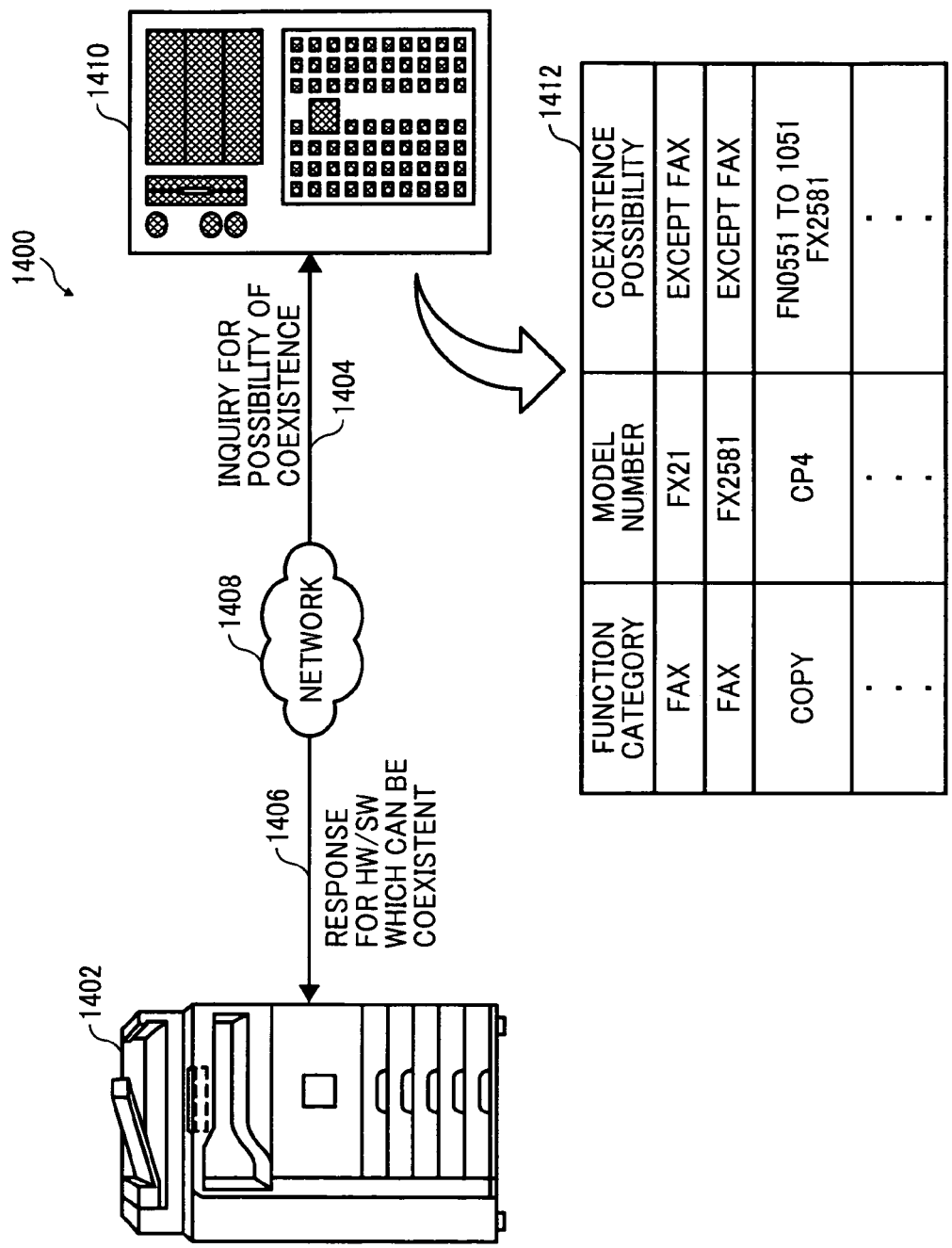
FIG. 14 is a schematic of an image forming system.

FIG. 14 indicates an example of an image forming system including the image forming apparatus according to the first embodiment. An image forming system 1400 includes an image forming apparatus 1402 and a resource server 1410 which are mutually connected to each other through a network 1408. When receiving an inquiry 1404 for possibility of coexistence from the image forming apparatus 1402, the resource server 1410 searches a coexistence database 1412. The resource server 1410 searches for HWs, SWs, or HW and SW which can be coexistent, and sends back the search result of software resources or hardware resources which can be coexistent, as a response 1406 for HW/SW which can be coexistent. The image forming apparatus 1402 analyzes the received response 1406, and creates the conflict solution screen 1300 shown in FIG. 13 to be displayed.

FIG. 15 indicates an example of a method 1500 of sharing a job history implemented by using the image forming apparatus. An image forming apparatus 1502 exports a job history as a text file or a structured document to a storage device 1512 such as an SD card or a memory stick, or uploads the job history to a shared storage 1508 provided as a storage server or the like through a network. Other image forming apparatus 1504 or 1506 downloads a shared job history from the shared storage 1508 through a network 1510, and executes an image forming process by using the shared job history. In other examples, the user imports a shared job history registered in a storage device 1514 such as an SD card or a memory stick to store the shared job history in RAM or the like, and an image forming process is executed by using the shared job history.

Figure 16A:
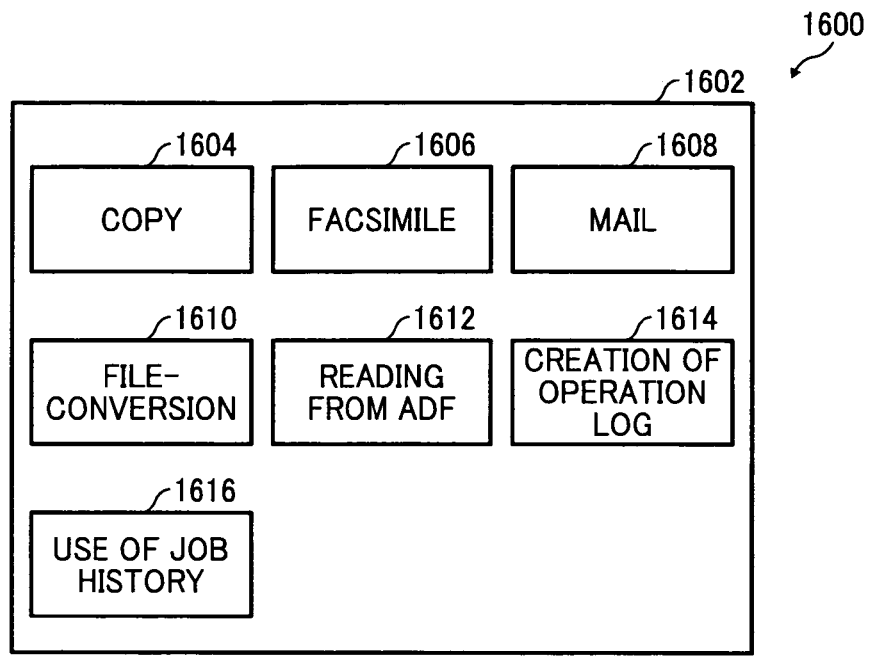
FIGS. 16A and 16B are schematics of examples of screen displays through which an explicit instruction is given when a shared job history is created and registered in the image forming apparatus.
Figure 16B:
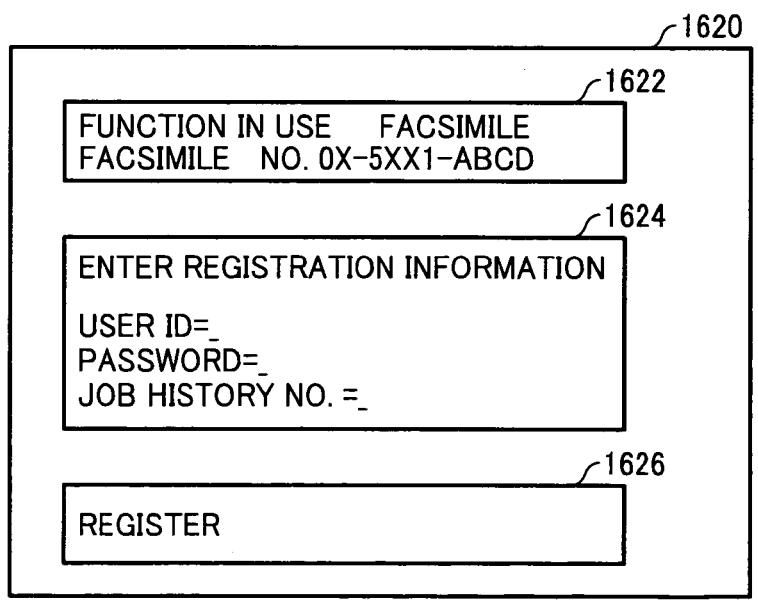

FIGS. 16A and 16B indicate examples of screen displays 1600 through which an explicit instruction is given when a shared job history is to be created and registered in the image forming apparatus 1502. FIG. 16A indicates a job start screen, and FIG. 16B indicates a shared-job-history registration screen. As shown in FIGS. 16A and 16B, following areas are registered in a display panel 1602, such as a copy job area 1604 for instructing a copy job, a facsimile job area 1606 for instructing facsimile transmission, and a mail job area 1608 for instructing mail sending. Displayed on the display panel 1602 are a file-conversion job area 1610 for instructing a file conversion job, an automatic document feeder (ADF) job area 1612 for instructing to read image data from an ADF, and a job-history creation area 1614 for instructing to create a job history from a job sequence entered by the user. Displayed also on the display panel 1602 shown in FIG. 16A is a job-history use area 1616 for instructing to re-execute a process by using the shared job history.

When the user touches the job-history creation area 1614 before a predetermined operation is executed, a subsequent user entry operation which is an entry sequence up to the job start button is buffered as a unit, and a process of converting the entry operation to a shared job history and creating the shared job history is executed. When the user instructs to use the shared job history by touching the job-history use area 1616, the interpreter module 206 and the shared-job-history managing module 208 are activated through a method call or the like, and the shared job history is acquired from the SD card, the memory stick, or from the shared storage 150 or 1508, which enables re-execution of jobs.

FIG. 16B indicates an example of a display screen 1620 displayed right after the facsimile transmission process explained with reference to FIG. 5 is executed when the user depresses the job start button after a job-history creation instruction is issued. As shown in FIG. 16B, when the user finishes checking of a predetermined entry and depresses the job start button, the display screen 1620 is displayed. Displayed on the display screen 1620 is a job-history display area 1622 displaying job contents entered by the user, and the job contents to be registered as a shared job history are displayed so that the user can check the contents.

Displayed also on the display screen 1620 is a registration entry area 1624 displaying a screen used to register a job-history ID value, user ID, and password, or the like, which enables the shared job history to be registered and searched. The user checks the job history to be registered, enters specified data, and then touches a registration area 1626 for instructing to execute registration, and thus, registering the shared job history in the storage device 146 or in the shared storage 1508.

As explained above, the image forming apparatus according to the first embodiment can provide an image forming apparatus capable of sharing the job history with other image forming apparatuses, and a method and program of controlling the image forming apparatus. According to the present invention, it is also possible to provide the image forming apparatus capable of using the conventionally used job history by only minimum steps of input operation corresponding to a current user request, and to provide the control method and the program for the image forming apparatus. Furthermore, according to the present invention, it is possible to provide the image forming apparatus capable of reporting the user, when there is any job that cannot support the job history, of that effect so as to prompt the user to deal with the trouble and capable of executing only an operation executable at that time, and to provide the control method and the program for the image forming apparatus.

An outline of a second embodiment is explained below. The second embodiment is configured to solve the problems based on the conventional technology. An image forming apparatus creates a job history instance containing a device-specific code which is an operation code corresponding to at least an operation instructed by the user, and also containing an operating condition used when the operation is executed by using the operation code. A data structure capable of being created as a macro instance is encapsulated in the job history instance. The image forming apparatus encodes the device-specific code contained in the job history instance into a shared code such as a text code, to create a macro instance usable by other image forming apparatuses. Attributes contained in the macro instance are not particularly limited. Thus, the attributes are defined as a code set in which a converter encodes and decodes between an operation code and a text code which are different from each other for each device, in which a difference between devices can be resolved, and in which a job history executed by the image forming apparatus can be re-executed by other image forming apparatuses through execution by a macro execution module.

The job history instance and the macro instance are registered and managed by an object-oriented database (hereinafter, "OODB") in preferred embodiments. Each job history and macro are registered as an instance identified by an instance ID value, and attributes of the instance are allocated to an operation code of a job history, operating conditions, and other data.

The attribute which is contained in each instance and subsequently corrected or added with a schema by the user can be declared as a superclass. The value of the attribute declared as the superclass is inherited to a subclass instance. The macro instance is created so as to have the same attribute as that of a job history instance. When receiving a macro creation instruction from the user, the image forming apparatus excludes any attribute which can be corrected by the user, encodes an attribute value of an operation code which is a device-specific code of a corresponding job history to a shared code such as a text code, and registers the encoded attribute value in a corresponding attribute value of the macro instance.

The attribute capable of being corrected by the user is corrected at a superclass level, and is inherited to the job history instance and the macro instance. Therefore, by correcting the job history instance, the correspondingly created macro instance is corrected, which makes it possible to prevent the correction failure or correction error. The attribute capable of being corrected includes an operating condition and also a schema capable of being expanded by the user.

Moreover, the job history instance and the macro instance are registered and managed by OODB. Therefore, any one instance, of the job history instance and the macro instance, of which attribute has a value of NULL does not consume a memory space unlike the case where the one instance is ensured as a field. And thus, the memory resources can be saved when the job history and the macro are concurrently registered, which allows improvement of the number of registered job histories and macros.

Detailed configuration of the image forming apparatus according to the second embodiment is explained below. It is noted that the image forming apparatus 100 according to the second embodiment has the same functional configuration as that explained in the first embodiment with reference to FIG. 1.

Figures 17, 18:
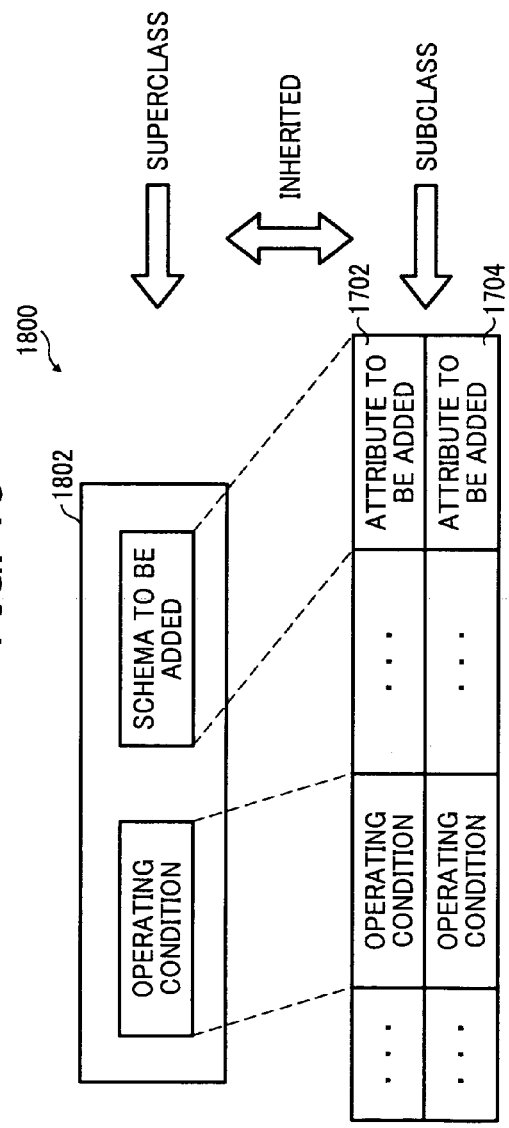
FIG. 17 is a schematic of an example of a data structure of a job history instance and a macro instance.
FIG. 18 is a schematic of an example of data formation of a superclass and a subclass in the data structure.

FIG. 17 indicates an example of a data structure 1700 of a job history instance and a macro instance created by the image forming apparatus 100 according to the second embodiment. The job history and the macro are created as OODB objects, and can be stored in the storage device 146 of the image forming apparatus 100. The storage device 146 can be a hard disk drive, an SD card, a memory stick, a floppy™ disk, MO, DVD, and CD-ROM. As for the data structure 1700, the entire or part of instance may be uploaded through the NIC 134 to the resource server 148 via the network 144.

As shown in FIG. 17, the data structure 1700 of the job history instance and the macro instance registers therein ID value 1706, name 1708, job (function) 1710, operation ID value 1712, version 1714, operating conditions 1716, creator name 1718, created date 1720, comment 1722, and data attribute 1724 for each instance. Also, as shown in FIG. 17, the data structure 1700 has a macro instance 1702 and a job history instance 1704 which are specified by the ID value 1706 as independent instances.

Furthermore, the job history instance 1704 and the macro instance 1702 include a common attribute. The operating conditions used in a particular operating mode of the image forming apparatus are contained in the job history instance 1704, which allows creation of the macro instance 1702 from the job history instance 1704 through an appropriate interpreter module. Moreover, an attribute value, of the job history instance 1704 or the macro instance 1702, which can be corrected or changed by the user is determined as a subclass of a corresponding superclass. The superclass is at least publicly specified, and an instance of the subclass is declared so as to be accessible. The correction and change in the second embodiment include correction and change of an attribute value and also addition of an attribute in association with addition of a schema.

For example, if the user wants to correct a facsimile transmission number which is one of the operating conditions of the job history instance 1704, a superclass of the operating conditions for the job history instance 1704 is called, to register the corrected facsimile transmission number at the superclass level. The operating conditions of the macro instance 1702 are declared as a subclass of the same superclass. Even when the user corrects the operating conditions of the job history instance 1704, and if the corresponding macro instance 1702 is already created, the correction of the superclass is inherited by the macro instance 1702 in the same manner as the job history instance 1704, and thus the correction to the job history instance 1704 is automatically reflected to the macro instance.

When macro instances having different operating conditions are created, according to a specific purpose, from the same job history instance 1704 without requiring consistency of the operating conditions of the job history instance 1704 and the macro instance 1702, the operating conditions may not be declared as the superclass.

Therefore, the user or the image forming apparatus can exclude a work to discretely correct the job history instance 1704 and the macro instance 1702, and workloads of the user can be reduced, and the consistency of the job history with corresponding macro can further be improved.

Moreover, an attribute added by the user or a system request is declared in the data structure 1700. In the example of FIG. 17, an attribute value to be added is set to NULL by default, and thus it is not shown in the macro instance 1702 and the job history instance 1704. Furthermore, in the job history instance 1704, the attributes of the name 1708 and the comment 1722 can be used so that the user can correct the name of the job history instance 1704 or of the macro instance 1702. Therefore, a NULL value is entered in the default setting of the job history instance 1704. Because the data structure 1700 shown in FIG. 17 is structured as an instance of an OODB object, a data area to ensure a field is not allocated to a box of the attribute having a value of NULL, of the attributes of the job history instance 1704, unlike a relational database.

In other examples, there is a case where memory resources are sufficient enough. And if an increase in the number of records does not need to be considered or if a structured query language (SQL) or the like is preferably used in relationship with other servers, a following case can also be thought of. More specifically, the case is such that a complex program is allowed in such a manner that a view is formed to correct an attribute and the view is separately registered as the job history and the macro. In the examples corresponding to these cases, a relational database can be used as a database, and the job history and the macro can also be registered therein as records.

FIG. 18 indicates an inheritance structure 1800 of the superclass and the subclass in the data structure 1700. As shown in FIG. 18, attributes that the user is allowed to change and add are declared as the superclass. The correction to the superclass is inherited to the attributes corresponding to the job history instance 1704 and the macro instance 1702. In the example as shown in FIG. 18, the operating conditions and the schema to be added are declared as the superclass. As for a superclass 1802, there is a case where a schema like an icon image is added, the icon image having a format such as Joint Photographic Experts Group (JPEG), JPEG 2000, BitMap (BMP), and Graphics Interchange Format (GIF). In this case, the addition of the schema is inherited, through registration of the schema in the superclass, by the job history instance 1704 and the macro instance 1702 which are a corresponding subclass. By employing the class structure as shown in FIG. 18, the job history instance 1704 and the macro instance 1702 can be efficiently corrected.

Figure 19:
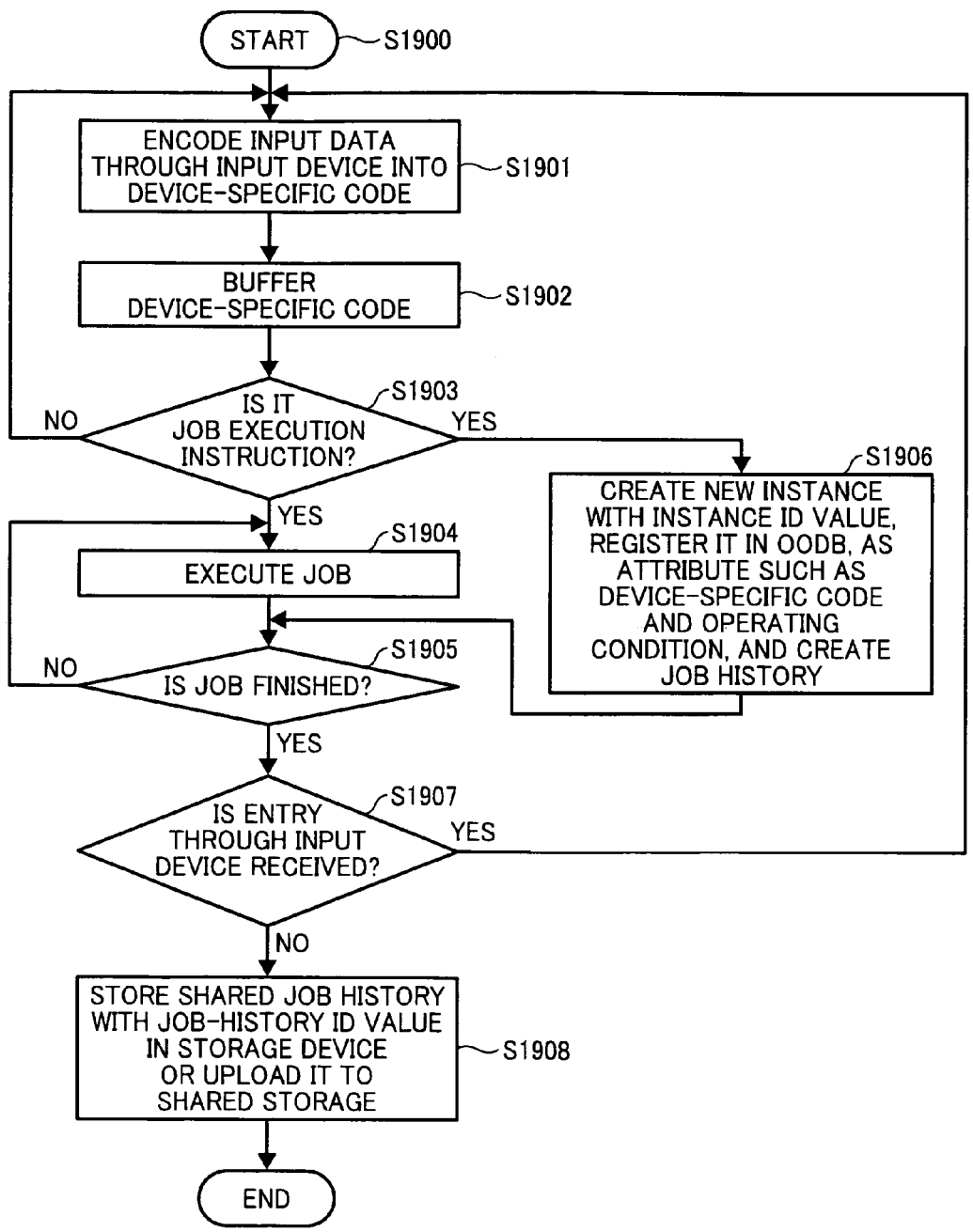
FIG. 19 is a flowchart of a process from acquisition of an operation code and entry of operating conditions to registration of a job history instance and a macro instance.

FIG. 19 indicates an example of a process from acquisition of an operation code and entry of operating conditions to registration of the job history instance 1704 and the macro instance 1702 executed by the image forming apparatus 100. The process of FIG. 19 is started at step S1900, a job-history creation instruction is received from the user at step S1901, and then the input data input through the input key or the touch panel is encoded to a device-specific code. At step S1902, the device-specific code is buffered, and at step S1903, it is determined whether the user depresses the job start button such as "start".

At step S1903, if the job start button is not depressed or a job execution instruction is not received (no), the process is branched to step S1901, and encoding and buffering of next input data are repeated. At step S1901, the image forming apparatus 100 may previously perform the processes as the background process without receiving an explicit instruction from the user, and collectively buffered device-specific codes can be registered as the job history instance 1704 and the macro instance 1702 in response to reception of a macro registration instruction which is explained later.

Thereafter, at step S1903, when the job start button is depressed and the job execution instruction is received (yes), the buffered code (execution command) is issued, and the job is executed at step S1904. In the example of FIG. 19, in parallel with the above process, at step S1906, a new instance is created as a job history instance with an instance ID value attached thereto, and attribute values of the device-specific codes are registered as attribute values of the new instance. An attribute value which is allowed to be corrected by the user is registered as an attribute value which is declared as the superclass of the new instance, and a creation process of the job history instance 1704 is executed. If the user previously specifies creation of the macro instance 1702, the macro instance 1702 may be created concurrently when the job history instance 1704 is created at step S1906.

The process of creating the macro instance 1702 from the job history instance 1704 is explained below. At first, this process is implemented by encoding the device-specific code contained by the job history instance 1704 to a shared code. The encoding in this case is implemented by activating the interpreter module, which executes encoding of the device-specific code buffered at that time to a text code sharable between the image forming apparatuses. It is noted that the process of creating the macro instance 1702 from the job history instance 1704 is explained in more detail later. When the process is ended, the buffer memory storing therein the device-specific code is cleared to be ready for a subsequent entry through an input device such as the input key or the touch panel.

At step S1905, it is determined whether a sequence of jobs entered by the user is finished. If the sequence of the jobs is not finished (no), the process is returned to step S1904, where the jobs are completed. On the other hand, if the jobs are finished at step S1905 (yes), the process is branched to step S1907, where it is determined whether any entry other than a job start code through the input device is buffered. If the entry other than the job start code is received through the input device or if an address area corresponding to the input device of the buffer memory is not NULL (yes), the status is determined that the user enters a subsequent process, and thus the process is branched to step S1901, where the input data is encoded to the device-specific code. On the other hand, if it is determined that the user enters no data at step S1907 (no), the process is branched to step S1908.

At step S1908, the user stores the created job history instance in the storage device such as the NVRAM, the SD card, the memory stick, or the hard disk drive. And the user stores the job history instance 1704, or the job history instance 1704 and the macro instance 1702 in the storage device by respectively attaching different instance ID values thereto. In other examples, each created instance is uploaded to the resource server 148 formed as a storage server by using the HTTP or the FTP protocol. As for registration of the job history instance 1704, if the instruction is received from the user and a registration instruction is included therein, the registration and the like is executed, while if the registration instruction is not included, the created job history instance can be discarded.

The following example explains the case where at least the job history instance 1704 is registered without receiving an explicit registration instruction from the user in the default setting of the image forming apparatus 100.

Figures 20, 21:
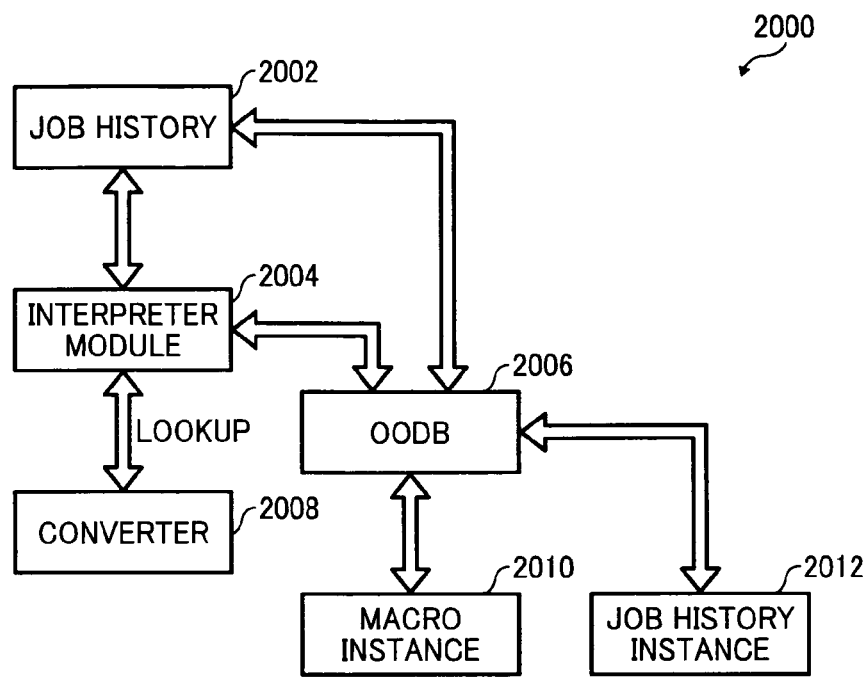
FIG. 20 is a diagram for explaining a process of creating a macro instance from a job history instance.
FIG. 21 is a diagram of an example of a converter used by an interpreter module.

FIG. 20 indicates an example of a function module 2000 that executes the process of creating the macro instance 1702 from the job history instance 1704. At first, the image forming apparatus 100 creates a job history 2002. At this stage, the job history 2002 is determined so far as a device-specific code corresponding to an input sequence entered by the user to the image forming apparatus 100. If the macro instance 1702 is not created, the job history 2002 is sent to an OODB 2006, a corresponding attribute is allocated in the order of sequence, and the device-specific code is registered as an attribute value for the corresponding attribute. Thereafter, the attribute value indicating the job history is described, and a job history instance 2012 is created.

On the other hand, when the macro instance 1702 is created, the job history instance 2012 is read by an interpreter module 2004. The interpreter module 2004 acquires a conversion table, for example, as an object of Java™ Script from a converter 2008. Thereafter, the interpreter module 2004 checks the device-specific code registered in the conversion table against the device-specific code registered in a corresponding attribute of the job history instance 2012. If the checking is successful, a text code registered corresponding to the device-specific code is acquired. If the checking is unsuccessful, a converting process to the macro instance 1702 is stopped according to the specification by the user made for the image forming apparatus 100. If the process of not creating the macro instance 1702 is employed upon unsuccessful checking, it is possible to prevent allocation of a memory area to the macro instance 1702 which is created by other image forming apparatus but cannot be reproduced by the image forming apparatus 100 that re-executes the process of the instance. Consequently, the storage life of the job history instance can be increased.

The interpreter module 2004 acquires the text code, and then transfers the text code to the OODB 2006. The OODB 2006 registers the received text code as an attribute value of a corresponding attribute of the created new instance, and text codes as attribute values are sequentially registered in the attributes corresponding to sequentially checked device-specific codes. In the example, when the checking of all the device-specific codes is successful and registration of the attributes of the instance is completed, the attribute value indicating the macro instance is added, and a macro instance 2010 is created and is registered in the OODB 2006.

When the image forming apparatus 100 reads the macro instance 2010 and executes the operation, the macro execution module is formed of the interpreter module 2004 and the user I/F 118. Upon execution of the macro instance, the interpreter module 2004 reads an attribute value of the macro instance 2010, refers to an object created from the conversion table, and decodes the shared code and the corresponding operating condition to an operation code which is the device-specific code and to an operating condition set specifically to the device. The decoded operation code and operating condition are buffered in a corresponding address area of the buffer memory in the order of reading. And thus the status where the device-specific code is buffered is regenerated. Thereafter, the user depresses the job start button such as "start", and the data in the buffer memory is transferred to each function unit of the image forming apparatus 100, which enables the image forming apparatus 100 to execute the sequence.

The reason why the device-specific code is encoded into the text code is because sharing capability between image forming apparatus is provided to the macro instance 2010. More specifically, the sharing capability is implemented by a plain text file, a structured file such as HTML and XML, or a file such as JavaScript Object Notation (JSON), each of which can be shared between different types of image forming apparatuses. If a structured document is used, the interpreter module 2004 can be formed of Java™ Script, J Script, or of Java™.

FIG. 21 indicates an example of installing the converter 2008, used by the interpreter module 2004, as a conversion table 2100. The conversion table 2100 can be registered as an independent data structure in the RAM 126 of the image forming apparatus 100. Furthermore, the conversion table 2100 may be made as a file of, for example, JSON, be taken in as an object by the interpreter module 2004 upon activation of the interpreter module 2004, and be used for the converting process as an object of Java™ Script.

As shown in FIG. 21, the conversion table 2100 registers therein a device-specific code 2102 and a text code 2104 corresponding to the device-specific code. The device-specific code 2102 is registered in such a manner that, for example, a device-specific code "001" corresponds to Copy in the text code, and "002" corresponds to a function such as Automatic Document Feeder in the text code. In the example of FIG. 21, a device-specific code "006" is the job start code and a corresponding text code is "Start". It is noted that the example as shown in FIG. 21 is only one of examples, and thus any other expression or coding can be used. Formats of device-specific codes are not particularly limited, and thus the code can be registered using any format such as a binary, an octet, a decimal, and a hexadecimal format, and can even contain therein a character.

As for the operating conditions, numerical values and characters corresponding to the device-specific code of the image forming apparatus 100 are entered in the conversion table 2100, which allows conversion between numerical-value codes such as decimal, hexadecimal, or binary notation, and also allows conversion between character codes. If a new function is added to the image forming apparatus 100, corresponding device-specific code and text code are added to the entries, and the entries are used for subsequent processes.

Figure 22:
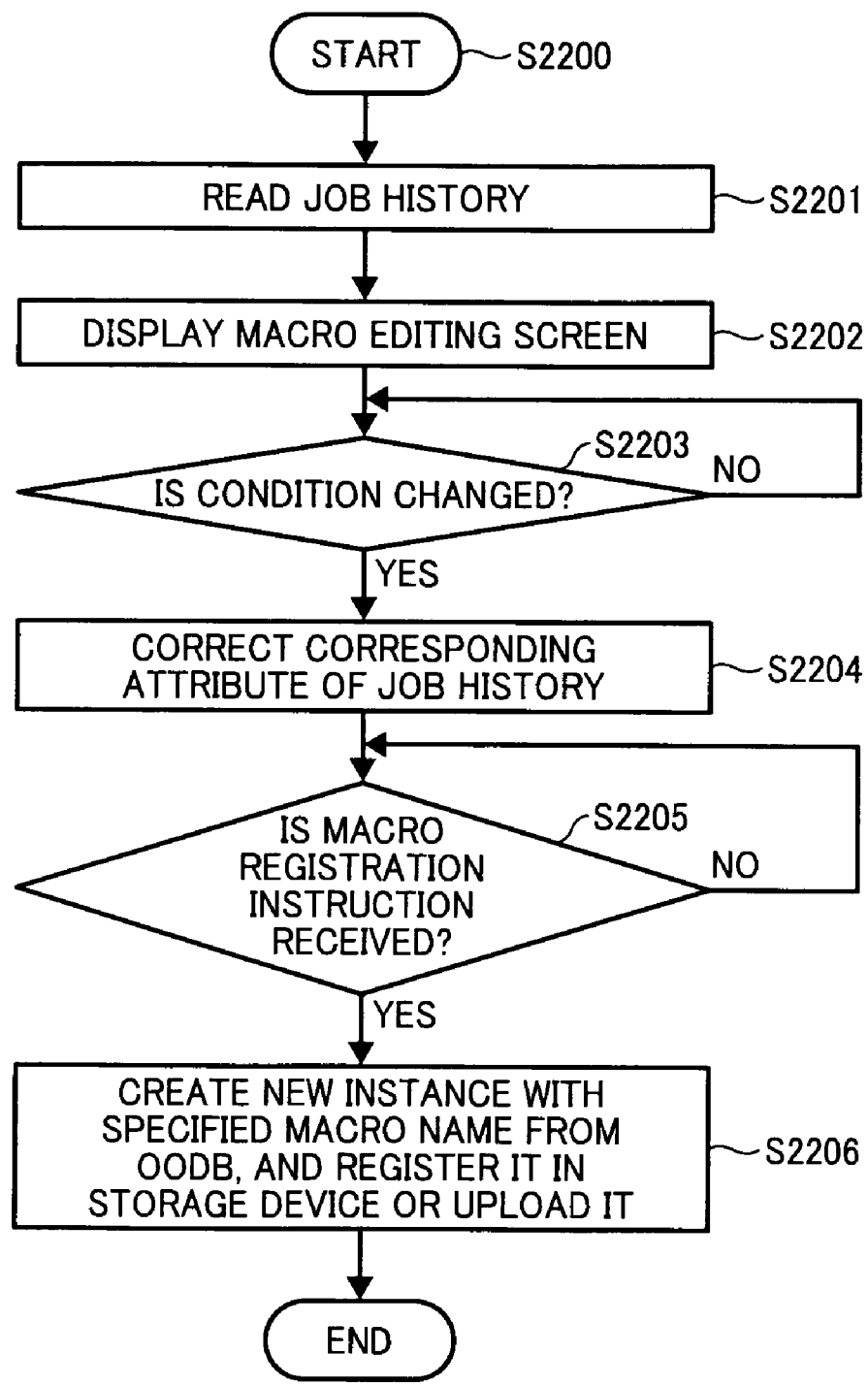
FIG. 22 is a flowchart of a process of creating a macro instance from the job history instance registered in the image forming apparatus.

FIG. 22 is a flowchart of an example of a process for creating the macro instance 1702 from the job history instance 1704 registered in the image forming apparatus 100. The process of FIG. 22 is started at step S2200, and at step S2201, the job history instance 1704 is read out of the storage device 146. At step S2202, the job history instance 1704 is read to display a macro editing screen. The user specifies a name of the macro and operating conditions to be edited on the macro editing screen, and changes an attribute value to be corrected of the read job history instance 1704.

In this case, both attributes which are a name attribute and an operating-condition attribute can be corrected as the superclass. As for the name attribute, the attribute at the subclass can be corrected and changed. As for the operating-condition attribute, the attribute at the superclass can be corrected and changed. Further, the name attribute is declared as the superclass, and the correction of the operating condition can be permitted at the subclass level. It is possible to appropriately select any of superclass attributes to declare the attribute corresponding to a specific purpose. However, when schema addition by the user is permitted, the attribute corresponding to the schema to be added needs to be declared as the superclass.

At step S2203, it is determined whether a change of the operating condition is received. If the operating condition is changed (yes), at step S2204, the corresponding attribute of the job history instance 1704 is corrected, and the process is branched to step S2205. If the operating condition is not changed (no), the process is branched to step S2203, where an instruction is waited for until timeout occurs.

At step S2205, it is determined whether the macro registration instruction is received through the macro editing screen. If the macro registration instruction is received (yes), at step S2206, the OODB is activated to create a new instance with a specified macro name attached thereto, the new instance is registered in the storage device 146, and then the process is ended at step S2207. If the macro registration instruction is not received at step S2205 (no), reception of the macro registration instruction is waited for until timeout occurs.

When the macro instance 1702 is created by using the process of FIG. 22, the corrected job history instance 1704 is inherited to the instance at the subclass, and thus consistency between the job history instance 1704 and the macro instance 1702 can be provided without newly correcting the job history instance 1704 caused by the created macro instance 1702.

FIG. 23 indicates a screen 2300 of a job-history contents list displayed when a job history is read at step S2201 of FIG. 22. The screen 2300 has an operation panel 2302 formed of a touch panel, CRT, or LCD on which entry areas are formed. The screen 2300 is displayed in a state where a job history instance is sorted as shown in a job-history contents list 2308 in the order of creating job histories in such a manner that a job history is displayed with a created date 2306 in the order from a new job history including "No." 2304. If the user is to correct a job history of No. 2 on the screen 2300 shown in FIG. 23, the user selects the job history of No. 2 by touching a corresponding area of the touch panel, operating an input key, or operating a mouse or a track ball to scroll up or down a scroll bar 2310. A selected job history 2312 of No. 2 is highlighted. Thereafter, the user performs an operation such as touching a save area 2314, and a macro editing screen 2400 as shown in FIG. 24 is displayed.

The macro editing screen 2400 contains a name entry area 2408 in which a name to be assigned to a macro after being edited or newly created is entered. Entry into the name entry area 2408 is temporarily buffered, and when the user touches a registration area 2404 to determine the entry, an instance corresponding to the macro is created and the entered name or the like is registered in a corresponding attribute of the instance. It is noted that name attributes are not necessarily the same as each other between the job history instance 1704 and the macro instance 1702. However, the name can be corrected as the superclass so that the user can easily associate management of job histories with management of macros.

Displayed in the lower side of the name entry area 2408 are attributes which the user is allowed to correct. In the example of FIG. 24, the operating condition and the addition of an icon as addition of a new schema are attributes which the user is allowed to correct, and thus these conditions are displayed as a display area 2410. When the user instructs correction or change through a change instruction area 2412 through which correction or change is possible, an entry area is set so as to change setting conditions such as size, processing, copies, and color, and thus the user can correct them. Input data at this time is temporarily buffered until the user instructs a subsequent process by touching the registration area 2404 or a cancel area 2406 or like. Attributes as follows are declared as the superclass, and input data is described in a variable declared as the superclass. More specifically, the attributes are allowed to be corrected and they are desired to ensure the consistency between the job history instance and the macro instance.

Formed in a display area is an entry area in which an instruction to add an icon as an addition schema is entered. When the user enters a change instruction through the change instruction area 2412 and instructs to add an icon, the display screen changes, and icon images that can be added are displayed. The user selects an icon from among the displayed icon images, and enters, for example, a "select" instruction. The entry causes a corresponding display of the entry area of FIG. 24 to be changed to, for example, "option: icon.jpg", and a value of a path or the like used for referring to an icon image is temporarily buffered.

The schema which can be added is not limited to the icon image, and thus, it is possible to set any other functions such as a stapling function, a punching function, and a sorter function which are added as options by the user. When any functions other than the icons are added, the attribute registered as the superclass is displayed in an option area, so that the user can enter it.

Provided in a display screen 2402 is an entry area to add a comment, in addition to the option. In the example where the macro instance 1702 can be displayed as an icon, the user points an operation cursor on the icon, to allow a comment to be displayed. The user may refer to the displayed comment, and activate the macro instance.

The user touches the registration area 2404 after entering an attribute value to be corrected, and a new macro instance with an input name is created by the OODB. The concurrently buffered data is registered as an attribute value corresponding to an instance of the superclass or of the subclass. As explained above, the name attribute, the operating-condition attribute, and the comment attribute are registered in the superclass while the rest of the attribute values are registered in the subclass.

FIG. 25 indicates an example of a data structure 2500 when the image forming apparatus 100 creates a job history and a corresponding macro. The data structure 2500 includes ID value 2505, name 2508, job (function) 2510, operation ID value 2512, version 2514, operating conditions 2516, creator name 2518, created date 2520, comment 2522, icon 2524, and data attribute 2526, which are registered therein for each instance. In the data structure 2500, a corresponding macro instance 2506 is formed from the job history instance 1704 registered in the data structure 1700 as shown in FIG. 17, and is additionally registered as an ID value No. 3. Registered in the macro instance 2506 is "facsimile transmission" as the name attribute 2508. The operating-condition attribute 2516 is not corrected by the user, and thus the same value as that of a job history instance 2504 is registered. Furthermore, the job history instance 2504 is also registered in the data structure 2500.

Furthermore, a new comment "Facsimile transmission: xxx division" is added to the comment attribute 2522 by the user. An attribute value indicating macro is registered in the data attribute 2526. In the example of FIG. 25, the operating-condition attribute and the comment attribute can always be provided with the same value because the value of superclass is referenced.

On the other hand, in the example of FIG. 25, the attribute value at the subclass of the name attribute 2508 is corrected, and thus "facsimile transmission" is added to the name attribute corresponding to the macro instance 2506. However, the corresponding attribute value of the job history instance 2504 remains NULL. The attribute values of the job history instance 2504 having a value of NULL are only the name attribute and the comment. However, by increasing the attribute values which are not necessary to be stored as job histories and by allowing the user to correct the subclass of the increased attribute values on the macro editing screen 2400, it is further possible to prevent waste of memory resources in the data structure 2500 and to therefore increase the period for storage of the instances in the data structure 2500.

In the example as shown in FIG. 25, when creating macro from the job history instance 2504, the user desires to display an icon, and therefore adds the icon attribute to the schema. The icon attribute which is the schema added to the job history instance 2504 is registered as the superclass, and the corresponding macro instance is also inherited. Therefore, schema extension is reflected without user's individual registration of the job history instance 2504 and the macro instance 2506, and thus, the same attribute value "Facsimile-.jpg" is registered as the icon attribute for the job history instance 2504 and the macro instance 2506.

Figure 26:
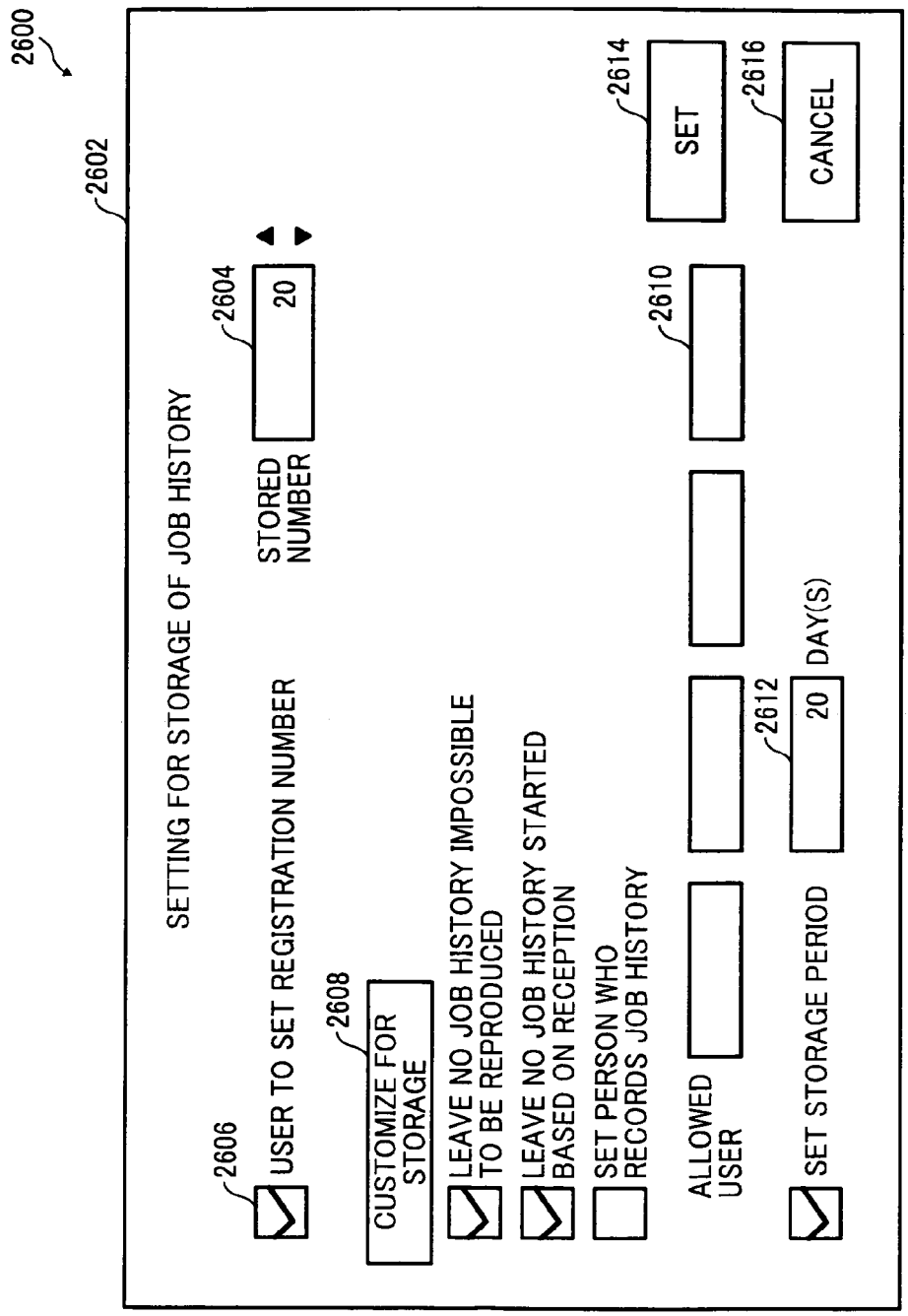
FIG. 26 is a schematic of an example of a job-history storage setting screen through which storage of job histories is set.

FIG. 26 indicates an example of a job-history storage setting screen where storage of job histories is set. A job-history storage setting screen 2600 as shown in FIG. 26 contains therein a plurality of entry areas 2604 to 2616 in a display screen 2602. The entry area 2604 is used to set the stored number of job histories. An area to correct the number of upper limit to be registered is provided adjacent to the entry area 2604, and the user can therefore set the stored number of job histories which is the upper limit or below provided in the image forming apparatus. The stored number of job histories is actively displayed by checking a check box 2606 used when the user specifies a change of the stored number, and thus entry can be made.

On the other hand, the entry area 2608 is provided in the display screen 2602. The entry area 2608 is used to customize job-history storage conditions. The customization of the job-history storage conditions includes settings such as (1) Leave no job history impossible to be reproduced, (2) Leave no job history started based on reception (explained later), and (3) Set a person who records a job history. In the example of FIG. 26, the user specifies the setting indicating "Leave no job history impossible to be reproduced". The job history impossible to be reproduced indicates that because the job history or macro are described by other image forming apparatus, even if these data are stored in a read-side image forming apparatus, the memory is just wasted. Thus, the user specifies the process of not registering them.

The job history started based on reception as a base point is implemented by setting the image forming apparatus such as facsimile reception, and thus there may be little request to be customized by the user. A person who records the job history is set when the amount of memory consumption is reduced and a large number of job histories for routine processes are recorded for a long period as much as and as long as possible. And thus the name and the user ID or the like of a user who records a job history can be explicitly specified in the entry area 2610 used to enter an allowed user's name.

Moreover, another check box for setting a storage period of job histories is provided in the display screen 2602. The user checks the check box to enable the storage period of the default setting, displayed in the entry area 2612, to be corrected. In an example of deleting a job history, even if either one of the stored number and of the storage period exceeds a set upper limit, the corresponding job history which exceeds the upper limit can be deleted. In another example, the stored number is set to high priority, and the job history of which storage period has passed is stored until the stored number reaches the upper limit. And the whole number is specified so that the job histories of which storage period has passed and the job histories in the order of the oldest in the date attribute reach the upper limit or below when the stored number reaches the upper limit, and the specified number of job histories can be collectively deleted.

In both examples, setting can be made according to the request of the user, and the process for creating macro from the job history can be appropriately set corresponding to a use pattern of the user who executes it. As explained above, the image forming apparatus according to the second embodiment allows provision of the image forming apparatus and its control method and program. The provided image forming apparatus effectively uses job histories to form an image, prevents failure of correction when the job history and the macro are corrected or when a new schema is added, and improves efficiency of the processes of correction or addition in association with each other while saving the memory resources.

The functions of the image forming apparatus according to the present invention can be implemented by any program executable by a device described in any object-oriented programming language such as assembler language, Visual C++, Visual Basic, Visual Basic for Application, C language, C++, Java™, Java™ Beans, Java™ Applet, Java™ Script, Perl, and Ruby. And the program can be stored in a computer-readable recording medium and distributed.

The present invention is explained so far by using the embodiments. However, the present invention is not limited by the embodiments and thus, the present invention can be changed within the scope persons skilled in the art can thought of, such as other embodiments, addition, change, and deletion. Any of modes is included in the scope of the present invention if the effect of the present invention is exhibited.

According to a first aspect of the present embodiment, a control method of creating and managing job histories in the image forming apparatus is provided. The control method includes a step of registering a job history, as a job history instance, that contains an operation code instructing a job operation to be executed and also contains operating conditions of the job operation, and creating an attribute value of a macro instance which can be interpreted by other image forming apparatuses, contains an attribute to reproduce the job history, and is encoded to an executable shared code. The control method also includes a step of reading the job history instance, encoding the operation code to the shared code, and registering the shared code as the macro instance, and a step of changing a corresponding attribute of other instance to be created.

According to a second aspect of the present embodiment, the control method according to the first aspect further includes a step of forming at least one changeable attribute as the superclass, and causing, when at least the one changeable attribute is corrected, the correction to be inherited to the job history instance and to the macro instance created corresponding to the job history instance.

According to a third aspect of the present embodiment, in the control method according to the first or the second aspect, the step of creating includes a step of encoding the operation code to the shared code by using the converter that registers therein the operation code in association with the shared code.

According to a fourth aspect of the present embodiment, in the control method according to any one of the first to the third aspects, the step of creating includes a step of converting the converter into an object, a step of sequentially reading the shared code and checking it against the converted object, and a step of registering the shared code which is successfully checked in the database in the sequence of the attributes.

According to a fifth aspect of the present embodiment, the control method according to any one of the first to the fourth aspects further includes a step of limiting the stored number of the job histories by using the upper limits of the stored number and the storage period of the job history instance to be stored.

According to a sixth aspect of the present embodiment, a device-executable program is provided to cause a computer to execute the steps according to any one of the first to the fifth aspects.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus including a processor that executes a job by using a job history, the image forming apparatus comprising:
   a buffering unit that buffers an operation code specific to the image forming apparatus and an operating condition corresponding to the operation code;
   an interpreter unit that encodes an operation code, which has been buffered in the buffering unit, to a text code and decodes original operation code from the text code;
   a shared-history creating unit that creates a shared job history that describes encoded text code and an operating condition corresponding to the encoded text code in association with a sequence of operation codes and registers hardware environment and software environment of the image forming apparatus in the shared job history;
   a re-executing unit that reads a shared job history created by other image forming apparatus and re-executes operation codes in read shared job history in order of being decoded
   a determining unit that acquires hardware environment and software environment from read shared job history and determines whether the read shared job history can be processed in current mounting environment of the image forming apparatus, and starts a job using the read shared job history when it is determined that the read shared job history can be processed; and
   a correcting unit that corrects the current mounting environment when the determining unit determines that the read shared job history cannot be processed in the current mounting environment.

2. The image forming apparatus according to claim 1, further comprising a converter which encodes the operation code to the text code, and decodes the shared job history to reproduce the operation code.

3. The image forming apparatus according to claim 1, wherein when decoding the shared job history, the interpreter unit decodes the text code corresponding to a job start code of the image forming apparatus to the operation code other than the job start code.

4. The image forming apparatus according to claim 1, further comprising a job-history storage unit that includes either one of a storage processor connected to a storage unit and a network processor connected to a network, and decides whether to store the shared job history in the storage unit via the storage processor or to upload the shared job history to a shared storage unit via the network processor.

5. The image forming apparatus according to claim 1, wherein the correcting unit is either one of a software unit for order entry of a hardware device and a software installer.

6. The image forming apparatus according to claim 1, wherein, the correcting unit sends either one data for the hardware environment and the software environment to a resource server to cause the resource server to operate the image forming apparatus in a current mounting environment of the image forming apparatus and in an operating condition determined under which the processes cannot be performed, the resource server being mutually connected to the correcting unit through the network and storing therein a resource database.

7. A method of controlling an image forming apparatus that executes a job by using a job history, the method comprising:
buffering an operation code specific to the image forming apparatus and an operating condition corresponding to the operation code;
encoding an operation code, which has been buffered in the buffering, to a text code and decoding original operation code from the text code;
creating a shared job history that describes encoded text code and an operating condition corresponding to the encoded text code in association with a sequence of operation codes and registering hardware environment and software environment of the image forming apparatus as the shared job history;
reading a shared job history created by other image forming apparatus and re-executing operation codes in read shared job history in order of being decoded;
acquiring hardware environment and software environment from read shared job history;
determining whether the read shared job history can be processed in current mounting environment of the image forming apparatus based on the hardware environment and the software environment acquired at the acquiring; and
starting a job using the read shared job history when it is determined at the determining that the read shared job history can be processed in the current mounting environment; and
correcting the current mounting environment when it is determined at the determining that the read shared job history cannot be processed in the current mounting environment.

8. The method according to claim 7, wherein the encoding/decoding includes either one of encoding and decoding by referring to a converter.

9. The method according to claim 7, wherein when decoding the text code, the decoding includes decoding the text code corresponding to a job start code for the image forming apparatus to the operation code other than the job start code.

* * * * *